United States Patent
Jaklic

(10) Patent No.: US 10,860,756 B1
(45) Date of Patent: Dec. 8, 2020

(54) FINDING INTERSECTIONS OF PLANAR PARAMETRIC CURVES BASED ON ERROR-CONTROLLED DISCRETIZATION

(71) Applicant: Cadence Design Systems, Inc., San Jose, CA (US)

(72) Inventor: Janez Jaklic, Feldkirchen (DE)

(73) Assignee: Cadence Design Systems, Inc., San Jose, CA (US)

( * ) Notice: Subject to any disclaimer, the term of this patent is extended or adjusted under 35 U.S.C. 154(b) by 2 days.

(21) Appl. No.: 16/430,020

(22) Filed: Jun. 3, 2019

Related U.S. Application Data

(63) Continuation of application No. 16/165,932, filed on Oct. 19, 2018, now abandoned.

(51) Int. Cl.
| | | |
|---|---|---|
| *G06F 30/23* | (2020.01) | |
| *G06F 30/34* | (2020.01) | |
| *G03F 7/20* | (2006.01) | |
| *G06F 111/10* | (2020.01) | |
| *G06F 119/18* | (2020.01) | |

(52) U.S. Cl.
CPC .............. *G06F 30/23* (2020.01); *G03F 7/705* (2013.01); *G06F 30/34* (2020.01); *G06F 2111/10* (2020.01); *G06F 2119/18* (2020.01)

(58) Field of Classification Search
CPC .. G06F 30/23; G06F 2119/18; G06F 2111/10; G06F 30/34; G03F 7/705
See application file for complete search history.

(56) References Cited

U.S. PATENT DOCUMENTS

| | | | |
|---|---|---|---|
| 7,346,886 B2 | 3/2008 | Fukagawa et al. | |
| 10,620,531 B1* | 4/2020 | Jaklic | ........................ G03F 1/70 |
| 10,678,986 B1* | 6/2020 | Jaklic | ...................... G06F 30/39 |
| 2003/0065494 A1* | 4/2003 | Croix | ...................... G06F 30/33 |
| | | | 703/2 |
| 2003/0083764 A1* | 5/2003 | Hong | ............... G05B 19/40932 |
| | | | 700/98 |
| 2006/0230365 A1 | 10/2006 | Bromberger | |

(Continued)

OTHER PUBLICATIONS

Li, W., et al., "Global Topological Changes of Offset Domains", 2011 Eigth International Symposium on Voronoi Diagrams in Science and Engineering, IEEE, pp. 83-90.

*Primary Examiner* — Stacy Whitmore
(74) *Attorney, Agent, or Firm* — Vista IP Law Group, LLP

(57) ABSTRACT

A method includes finding, for a discretized curve comprising multiple segments, first and second segments that are closer than a threshold. The method includes determining an intersection point of the first segment and the second segment, the intersection point associated with a first parameter value for the first segment and a second parameter value for the second segment, determining an error value as a distance between a first point in the parametric curve corresponding to the first parameter value and a second point in the parametric curve corresponding to the second parameter value, and selecting the intersection point when the error value is smaller than a precision tolerance. The method includes transforming the discretized curve by removing at least a segment between the first segment and the second segment, and providing the discretized curve to manufacture a mask for reproducing the feature in the integrated circuit.

20 Claims, 15 Drawing Sheets

(56) References Cited

U.S. PATENT DOCUMENTS

| | | |
|---|---|---|
| 2007/0226668 A1 | 9/2007 | Dasdan et al. |
| 2008/0024499 A1 | 1/2008 | Bateman |
| 2009/0324093 A1 | 12/2009 | Miarecki et al. |
| 2011/0022219 A1 | 1/2011 | Saied et al. |
| 2012/0017193 A1 | 1/2012 | Ou et al. |
| 2014/0321165 A1 | 10/2014 | Albea Sanchez et al. |
| 2018/0239860 A1 | 8/2018 | Allen |
| 2020/0151286 A1* | 5/2020 | Willis .................... G06F 30/17 |

* cited by examiner

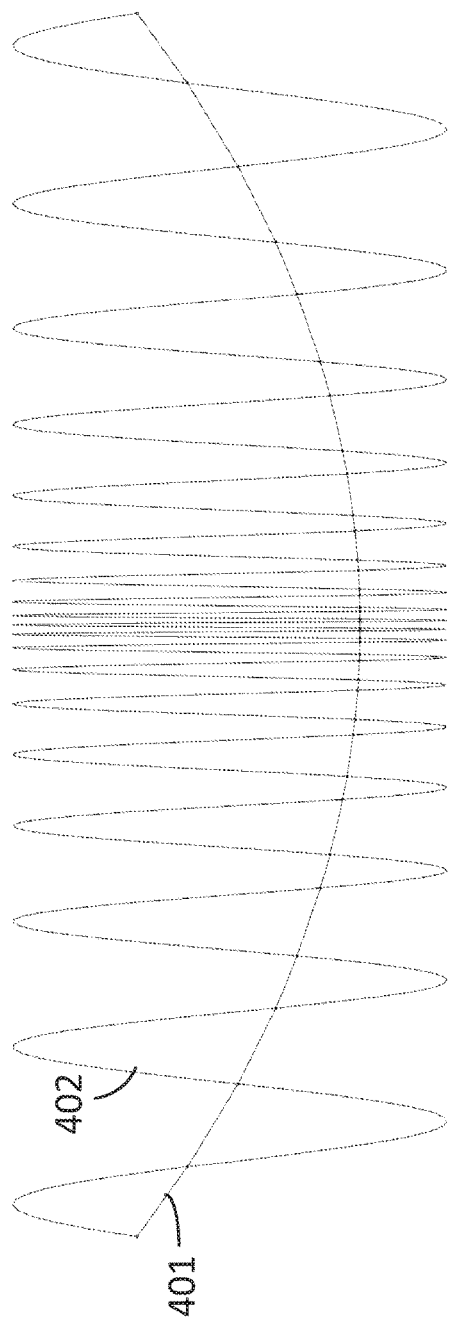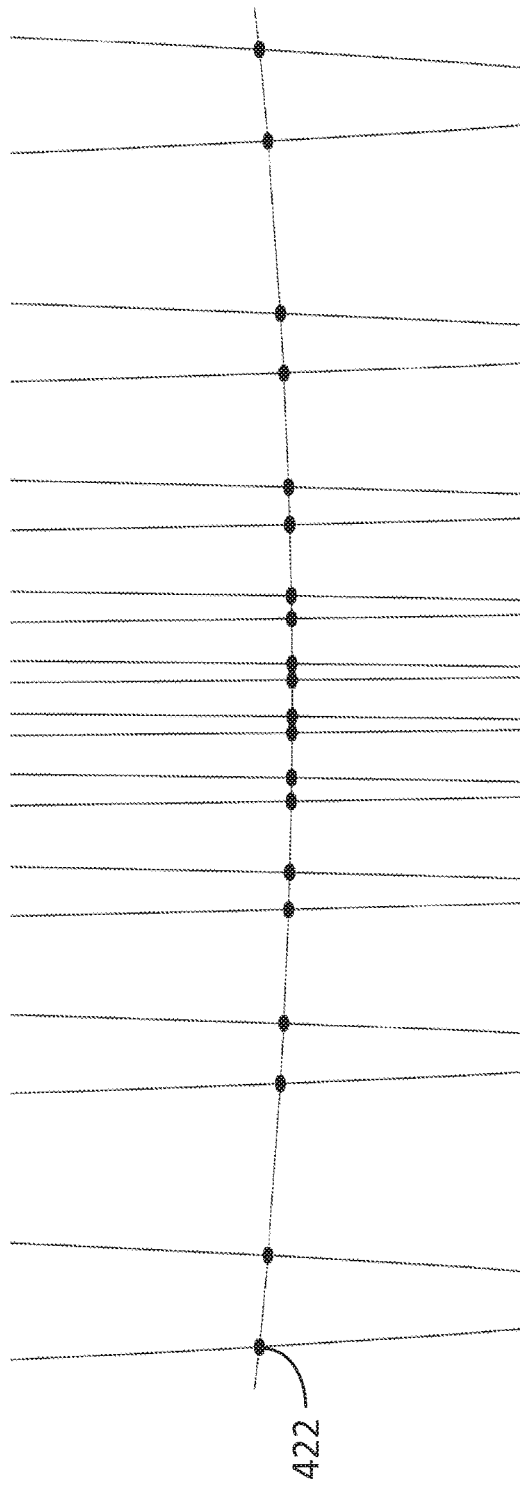

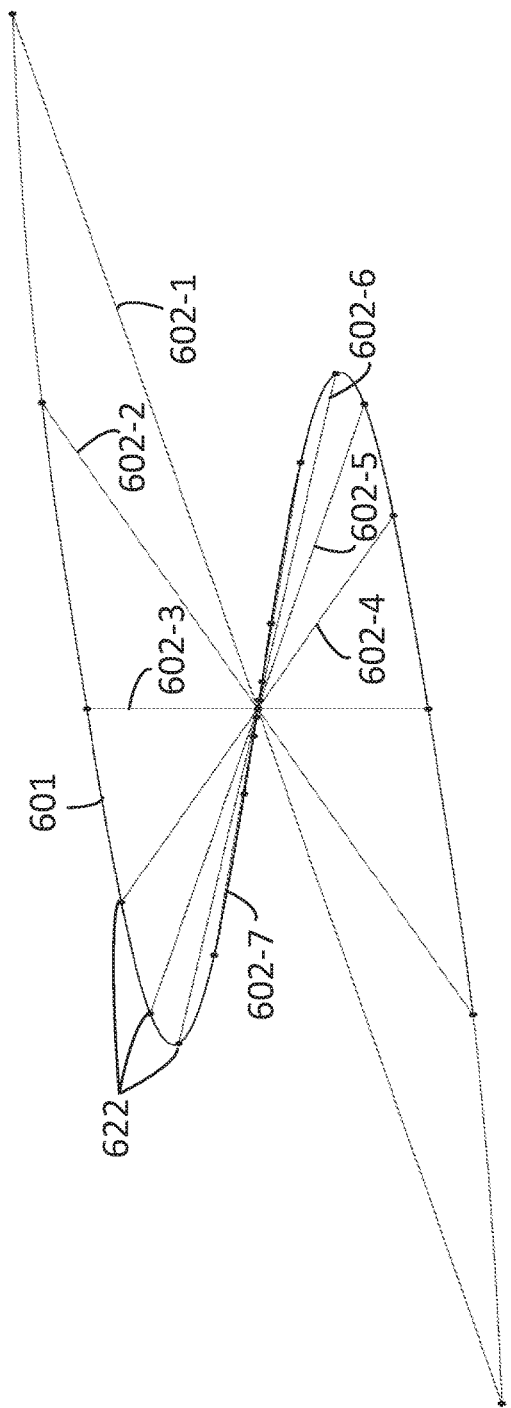
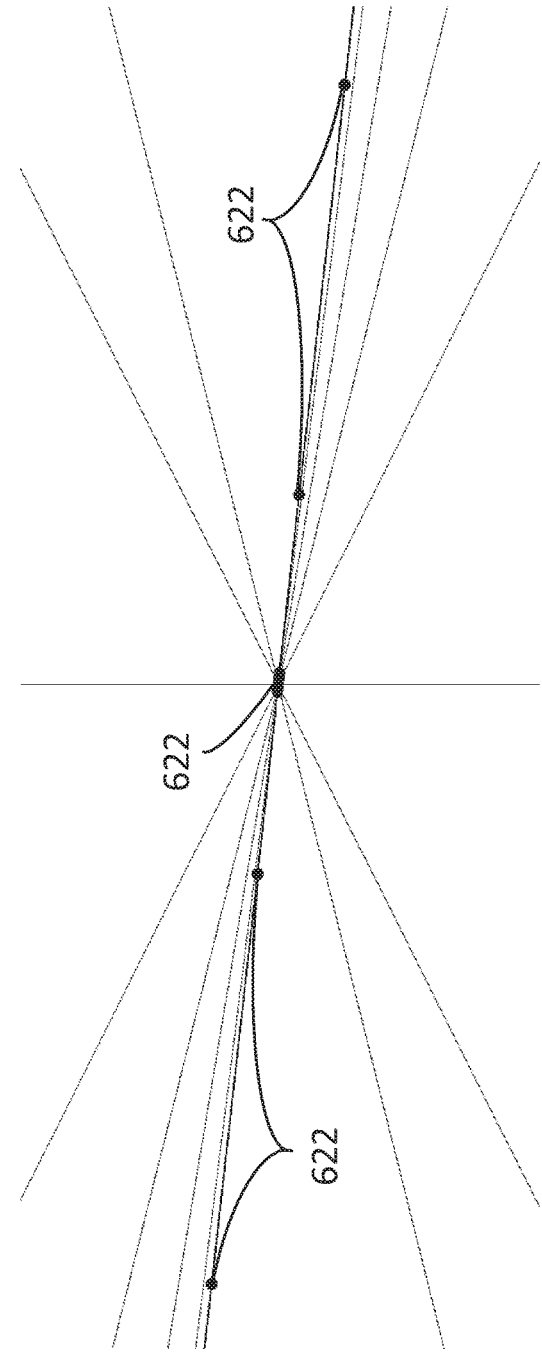
FIG. 6A
FIG. 6B

10,860,756 B1

FINDING INTERSECTIONS OF PLANAR PARAMETRIC CURVES BASED ON ERROR-CONTROLLED DISCRETIZATION

CROSS-REFERENCE TO RELATED APPLICATIONS

This application is a continuation application of U.S. patent application Ser. No. 16/165,932 entitled "FINDING INTERSECTIONS OF PLANAR PARAMETRIC CURVES BASED ON ERROR-CONTROLLED DISCRETIZATION," and filed on Oct. 19, 2018, the disclosure of which is hereby incorporated by reference in its entirety.

TECHNICAL FIELD

Embodiments described herein are generally related to the field of mask modeling and fabrication for integrated circuit (IC) production. More specifically, embodiments described herein are related to identify intersection points between arbitrary shapes for mask manufacturing in IC design and fabrication.

BACKGROUND

In integrated circuit (IC) design, mask fabrication is a critical step for reproducing circuit features with high fidelity. Current trends in IC fabrication include active and passive optical components that may have stringent geometrical specifications for adequate device performance. While electronic performance may be more flexible in terms of accurate geometrical fidelity with an IC design, the optical components are less tolerant to shape errors and deviations from the prescribed model. Moreover, the shapes of optically active or passive components may deviate from the more traditional rectilinear or square type electronic components. Accordingly, it is desirable to develop methods and system to accurately transfer such sophisticated shapes and features to a mask for IC fabrication.

The description provided in the background section should not be assumed prior art merely because it is mentioned in or associated with the background section. The background section may include information that describes one or more aspects of the subject technology.

SUMMARY

In a first embodiment, a computer-implemented method includes finding, for a discretized curve comprising multiple segments, a first segment and a second segment that are closer than a threshold. The discretized curve is obtained within a tolerance value from a parametric curve indicative of a feature in an integrated circuit based on a parameter value, the first segment is associated with a first interval of the parameter value, the second segment is associated with a second interval of the parameter value, and the first interval and the second interval do not overlap. The computer-implemented method also includes determining an intersection point of the first segment and the second segment, the intersection point associated with a first parameter value for the first segment and a second parameter value for the second segment, and determining an error value as a distance between a first point in the parametric curve corresponding to the first parameter value and a second point in the parametric curve corresponding to the second parameter value. The computer-implemented method also includes selecting the intersection point when the error value is smaller than a precision tolerance, transforming the discretized curve by removing at least a segment between the first segment and the second segment, and providing the discretized curve to manufacture a mask for reproducing the feature in the integrated circuit.

In a second embodiment, a system is disclosed that includes a memory storing instructions and one or more processors configured to execute the instructions to cause the system to find, for a discretized curve comprising multiple segments, a first segment and a second segment that are closer than a threshold. The discretized curve is obtained within a tolerance value from a parametric curve indicative of a feature in an integrated circuit based on a parameter value, the first segment is associated with a first interval of the parameter value, the second segment is associated with a second interval of the parameter value, and the first interval and the second interval do not overlap. The one or more processors further execute instructions to determine an intersection point of the first segment and the second segment, the intersection point associated with a first parameter value for the first segment and a second parameter value for the second segment, and to determine an error value as a distance between a first point in the parametric curve corresponding to the first parameter value and a second point in the parametric curve corresponding to the second parameter value. The one or more processors also execute instructions to select the intersection point when the error value is smaller than a precision tolerance, to transform the discretized curve by removing at least a segment between the first segment and the second segment, and to provide the discretized curve to manufacture a mask for reproducing the feature in the integrated circuit.

In yet another embodiment, a non-transitory, machine-readable storage medium is disclosed that includes instructions which, when executed by a processor, cause a computer to perform a method. The method includes finding, for a discretized curve comprising multiple segments, a first segment and a second segment that are closer than a threshold. The discretized curve is obtained within a tolerance value from a parametric curve indicative of a feature in an integrated circuit based on a parameter value, the first segment is associated with a first interval of the parameter value, the second segment is associated with a second interval of the parameter value, and the first interval and the second interval do not overlap. The method also includes determining an intersection point of the first segment and the second segment, the intersection point associated with a first parameter value for the first segment and a second parameter value for the second segment, and determining an error value as a distance between a first point in the parametric curve corresponding to the first parameter value and a second point in the parametric curve corresponding to the second parameter value. The method also includes selecting the intersection point when the error value is smaller than a precision tolerance, transforming the discretized curve by removing at least a segment between the first segment and the second segment, and providing the discretized curve to manufacture a mask for reproducing the feature in the integrated circuit.

In a further embodiment, a system is disclosed that includes a means to store instructions and a means to execute the instructions to cause the system to perform a method. The method includes finding, for a discretized curve comprising multiple segments, a first segment and a second segment that are closer than a threshold. The discretized curve is obtained within a tolerance value from a parametric curve indicative of a feature in an integrated circuit based on a parameter value, the first segment is associated with a first interval of the parameter value, the second segment is associated with a second interval of the parameter value, and the first interval and the second interval do not overlap. The method also includes determining an intersection point of the first segment and the second segment, the intersection point associated with a first parameter value for the first segment and a second parameter value for the second segment, and determining an error value as a distance between a first point in the parametric curve corresponding to the first parameter value and a second point in the parametric curve corresponding to the second parameter value. The method also includes selecting the intersection point when the error value is smaller than a precision tolerance, transforming the discretized curve by removing at least a segment between the first segment and the second segment, and providing the discretized curve to manufacture a mask for reproducing the feature in the integrated circuit.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings:

FIGS. 4A and 4B illustrate multiple intersection points between a first parametric curve and a second parametric curve, according to some embodiments.

FIGS. 6A and 6B illustrate multiple intersection points between a first parametric curve and a family of rectilinear curves, the family of rectilinear curves having varying slopes and having the center of the first parametric curve as a common point, according to some embodiments.

Figure 1:
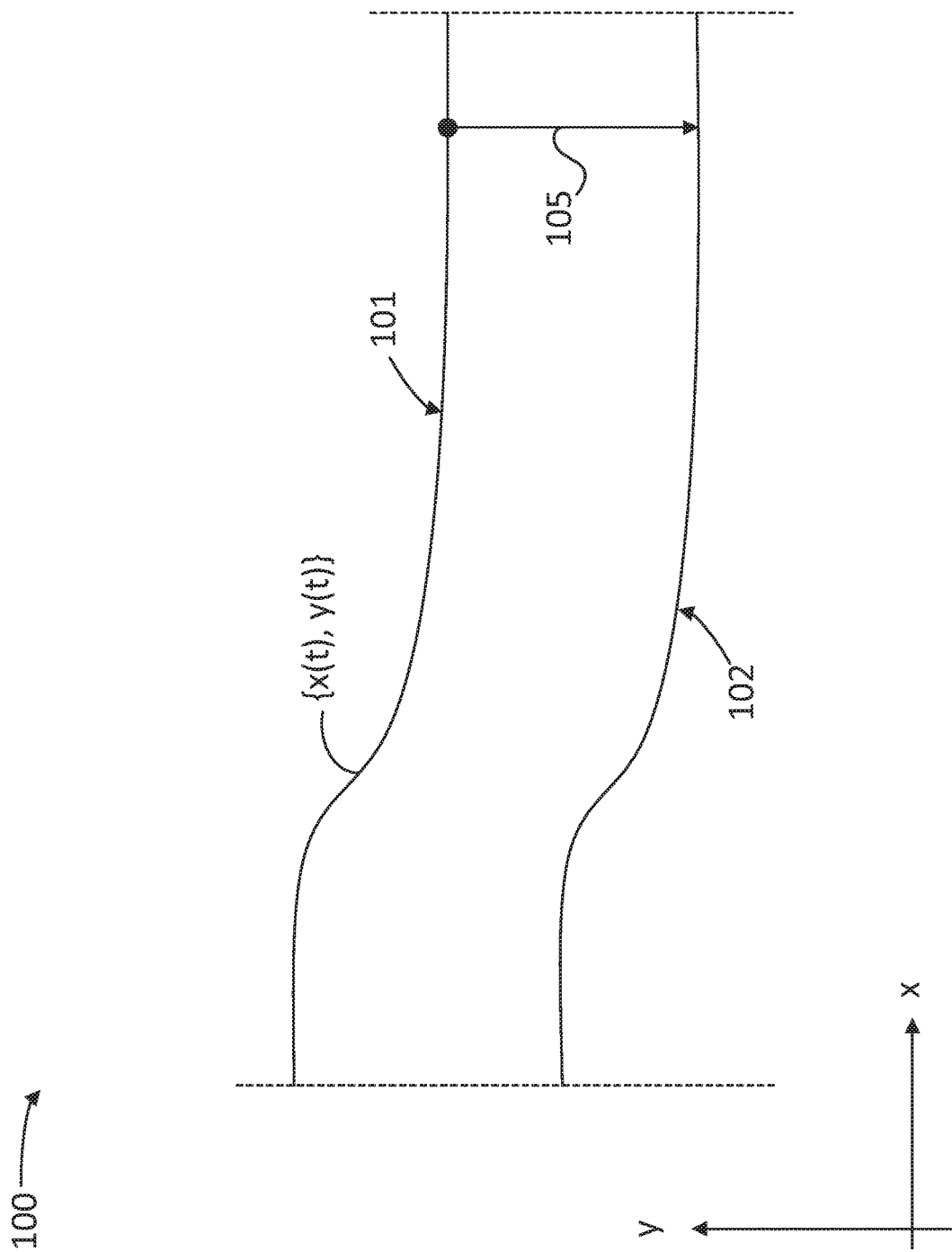
FIG. 1 illustrates a schematic of a circuit feature for an IC design, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and descriptions are to be regarded as illustrative in nature and not restrictive.

General Overview

The disclosed system provides a method for finding intersections in parametric curves provided for reproducing IC features in mask fabrication. The intersections form boundaries of spurious loops that may be removed from the mask design.

The disclosed system addresses a technical problem tied to computer technology and arising in the realm of computer networks, namely the technical problem of finding intersection points of curves having arbitrary parametric definitions. The disclosed system solves this problem by implementing a discretized segmentation that closely resembles the parametric curve, thereby reducing the problem to that of finding the intersection between line segments. This allows for the computation of multiple intersection points for parametric curves having arbitrary shape to any desired resolution, without exhaustion of valuable computational resources.

Embodiments as disclosed herein provide a solution to the above technical problem by performing a Taylor series approximation to the parametric curves over arbitrarily small line segments, and then determining whether the intersections between two or more line segments are valid intersection points within a desired accuracy from true intersection points of the parametric curve.

Embodiments as disclosed herein greatly enhance the performance of a computer by reducing the computational burden and processing time of finding multiple intersection points and self-intersection points between arbitrarily complex curves without exhausting computational resources.

A method for finding intersections of arbitrary planar curves defined by analytic functions in parametric form is presented. The method uses the error-controlled discretization based on the Taylor series expansion and symbolic algebra to compute curve function derivatives and to approximate each curve by a set of linear segments and finds those pairs of segments that are closer to each other than the discretization tolerance. By successively decreasing the discretization tolerance, the intersection points between the linear segments rapidly converge to the intersection points between the actual curves, which can thus be determined with arbitrary numerical precision. The method proves to be insensitive to the detailed behavior of the curve functions around the intersections that could pose a problem for methods finding curve intersections by solving systems of non-linear equations, such as multiple intersections in a very small region or intersections between curves with almost collinear tangents.

In the following we present a method for determining all intersections and self-intersections of an arbitrary set of curves (1) that avoids the problems of solving a general system of equations by using error-controlled curve discretization based on Taylor series expansion and symbolic algebra to obtain the derivatives of the curve functions. Such error-controlled curve discretization method is described separately. Given such a method, the basic idea is to approximate each curve up to a certain discretization tolerance by a set of linear segments and use the sweep line algorithm to find those neighboring pairs whose bounding rectangles are within the Manhattan distance of not more than twice the discretization tolerance. The curves between the end points of each neighboring pair of segments are then discretized with an order of magnitude smaller discretization tolerance and the process recursively repeated. The recursion is stopped either when no more segments closer than discretization tolerance are found, or when the segments intersect such that the corresponding intersections on the actual curves are closer than the given minimum distance, in which case they are added to the list of curve intersections. The method must be able to deal with the cases of collinearly overlapping lines and curves with stationary points where curve derivatives vanish or almost vanish. The method has been successfully tested on several examples which otherwise are difficult to deal with by the other methods, such as of curves with a large density of intersections, curves with almost parallel tangents at the intersections, and collinearly overlapping lines and curves with stationary points and cusps.

FIG. 1 illustrates a schematic of a circuit feature 100 for an IC design, according to some embodiments. Feature 100 may be delimited by parametric curves 101 and 102 in a plane (e.g., the XY plane). In some embodiments, one of the parametric curves (e.g., curve 102) may result from a parallel displacement of a parametric curve (e.g., parametric curve 101) by a parallel offset 105.

Planar geometrical objects in Computer Aided Design systems are usually represented using only certain classes of curves. Typically these would include lines, conic sections (circular and elliptic arcs) and polynomial splines in mechanical design, lines and circular arcs in printed circuit board design, and only lines in integrated circuit design. The restriction to certain classes of curves applies not only to design tools, but also to data formats used for exchanging manufacturing information. Although this is not a limitation in the original design domain, for some applications geometrical representation by more general classes of curves is needed. For example, integrated circuit layout design tools are now not only used for designing electrical devices and interconnect, but also structures in other types of technologies that can be implemented on silicon, such as silicon photonics, MEMS, and microfluidics. The geometries of such devices typically need to adhere to certain smoothness requirements or even be a mathematical solution of some underlying physical model; therefore they may not be satisfactorily described by any of the predefined classes of curves. Instead, they may be more naturally described by sets of general planar parametric curves.

$$r(t)=\{x(t),y(t)\}\ t_1 \leq t \leq t_2 \tag{1.1}$$

where r is a point on the curve in the plane with coordinates (x; y) and t is the parameter running from $t_1$ to $t_2$. We assume here and in the following that the curve functions in (1) are analytical and thus infinitely differentiable.

Of particular importance for the design of photolithographic masks are sets of such curves defining boundaries of closed regions in the plane (e.g., the X-Y plane). In analogy to the commonly known set operations on polygons, such as union, intersection and subtraction, set operations on such boundaries can be defined in a similar way. An essential ingredient of such operations is the ability to find all intersections of the curves defining the boundary of the region. In the case of polygons this is straightforward since the boundary consists only of linear segments. In the case of boundaries defined by general curves (1), however, finding the intersections is much more difficult. Mathematically, finding the intersections between two curves r(t) and r'(t') is equivalent to solving the system of two non-linear equations with two unknowns $$f(t,t')=0 \tag{1.2}$$

$$g(t,t')=0 \tag{1.3}$$

where f(t; t')=x(t)−x'(t') and g(t; t') y(t)−y'(t'). In general, such a system may be solved iteratively, which however requires the initial guess for the values t and t'. When curves 101 and 102 have multiple intersections or even self-intersections, multiple guesses may be used to find all intersections. This may be difficult when the intersections are located close to each other. In some embodiments, when suitable initial guesses are found, then the intersections can be localized by a "Newton-Raphson" method, a "gradient" method, or similar. However, the above methods may also have difficulty converging when the intersecting or self-intersecting curves are almost parallel at the intersection point, or when the intersecting or self-intersecting curves approach each other to a very small distance without actually intersecting (e.g., a "tangential" point).

Figure 2:
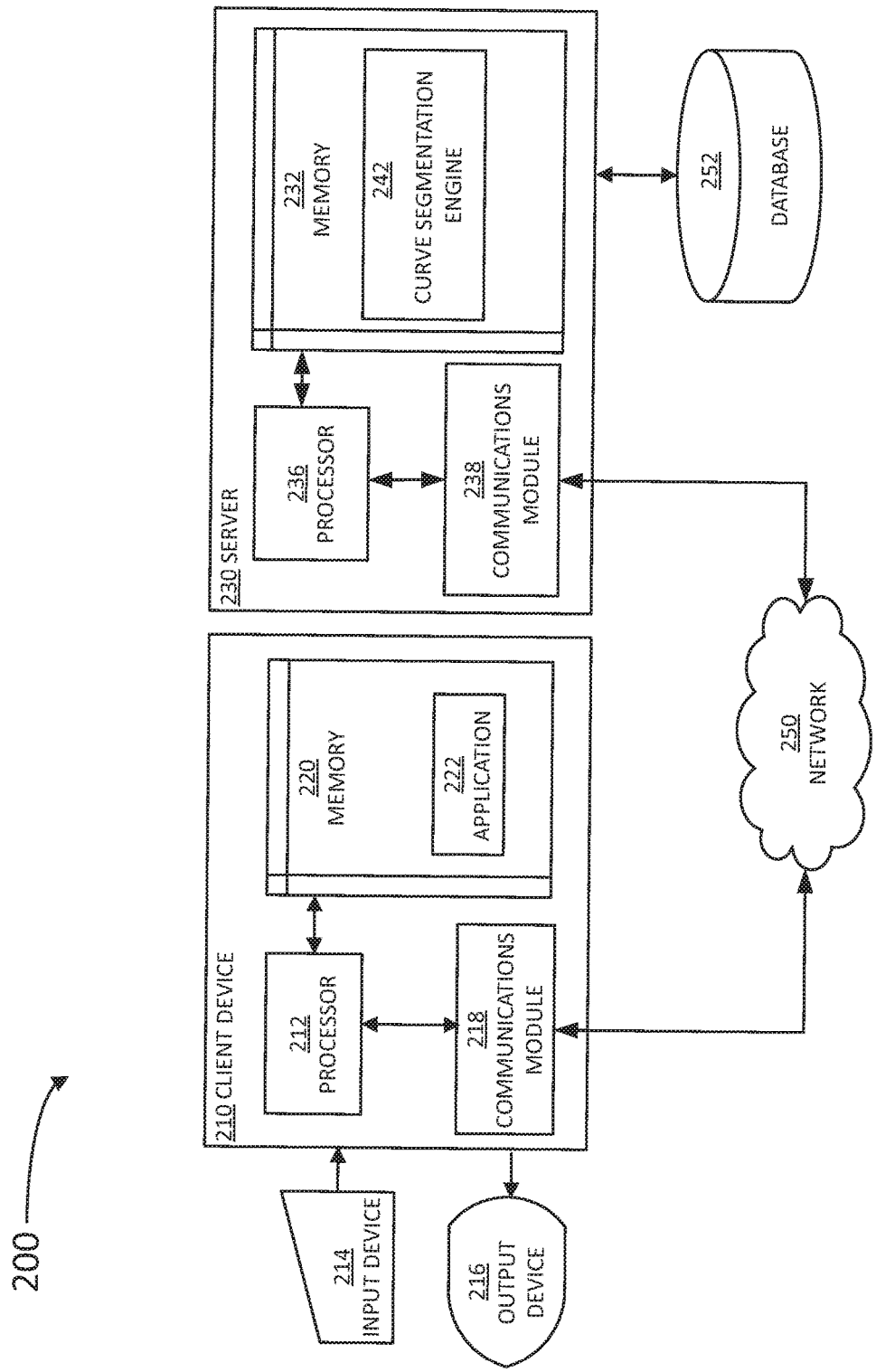
FIG. 2 illustrates an architecture including systems to identify intersection points of arbitrary parametric curves for IC manufacturing, according to some embodiments.

FIG. 2 illustrates an architecture 200, including systems to identify intersection points of arbitrary parametric curves for IC manufacturing, according to some embodiments. A client device 210 includes a processor 212 configured to execute instructions stored in a memory 220. Memory 220 may include an application 222, which includes commands that when executed by processor 212 cause client device 210 to perform methods consistent with the present disclosure. Application 222 may include a runtime software program running on client device 210 to issue commands to server 230 for controlling a curve segmentation engine 242. For example, in some embodiments, the user may provide a parametric curve, r(t) to server 230 via application 222, wherein the parametric curve, r(t), is indicative of a feature in an IC circuit (e.g., parametric curve 101 or parallel curve 102). Server 230 may be configured to provide to client device 210 a set of points that are the vertices of a segmented curve representative of the feature in the IC circuit, so that application 222 may provide a layout for a mask fabrication. The segmented curve may be free of intersection points or self-intersection points, so that the feature may be reproduced accurately in the mask. The mask may then be used in the fabrication of the IC circuit, including the desired feature.

Client device 210 may also include a communications module 218 that enables client device 210 to transfer data, provide commands, and receive instructions from server 230 through a network 250. Client device 210 may be coupled with an input device 214 (e.g., a mouse, a keyboard, a touch screen display, and the like) and an output device 216 (e.g., a display, a speaker, and the like). Accordingly, a user may enter commands and queries to client device 210 with input device 214, and receive graphic and other information from client device 210 via output device 216. In some embodiments, application 222 may control input device 214 and output device 216 through a graphic user interface (GUI), enabling a user to have access to server 230.

Server 230 may include a memory 232, a processor 236, and a communications module 238 to transfer data, receive commands, and provide instructions from client device 210 through network 250. Memory 232 and processor 236 may be communicatively coupled with a curve segmentation engine 242, as disclosed herein.

Database 252 may store, or the user may provide via client device 210, multiple parametric curves, $r_k(t)$, to curve segmentation engine 242. The parametric curves may be generally defined as $$r_k(t)\{x_k(t), y_k(t)\}, t_{k1} \leq t \leq t_{k2}, K=1, \ldots K \quad (2.1)$$

The curve functions are represented by arrays of symbolic expressions $x[1, \ldots, K]$ and $y[1, \ldots, K]$. The bounds of the parameter intervals are stored in the arrays $t_1[1, \ldots, K]$ and $t_2[1, K]$ defined by $$t_1[k] := t_{k1}, \text{ and}$$

$$t_2[k] := t_{k2}.$$

Curve segmentation engine 242 may be configured to discretize the parametric curve r(t) by a set of 'n' points corresponding to the parameter values $$\tau_{k1} = t_{k1}, \tau_{kn} = t_{k2}, \tau_{ki} < \tau_{ki+1} \quad (2.2)$$

such that when the curve between successive discretization points is approximated by linear segments $$s_i(\tau) = r(\tau_{ki}) + \frac{\tau - \tau_{ki}}{\tau_{ki+1} - \tau_{ki}} \cdot (r(\tau_{ki+1}) - r(\tau_{ki})), \tau \in [\tau_{ki}, \tau_{ki+1}] \quad (2.3)$$

the maximum deviation is less than the given discretization tolerance, ε. Given such discretization method, the intersections, including self-intersections, of a set of curves (2.1) can be found with the precision, λ.

To discretize any of the curves (2.1), curve segmentation engine 242 may be configured to include a discretization tolerance ε and to perform a Taylor series expansion of order 'm' (e.g., m=3) and correlation factor β (e.g., β=1) on curves (2.1) by computing the array of values $$\tau[k][1, \ldots, n_k] \leftarrow \text{discretization}(x[k], y[k], t_{k1}, t_{k2}, n, \varepsilon, \beta)$$

In some embodiments, curve segmentation engine 242 also includes functions to obtain the numerical value of the function represented by symbolic expression, e, at parameter value, t: EVALUATE(e, t). Further, in some embodiments, curve segmentation engine 242 includes a function DERIVE (e) to get the symbolic expression representing the derivative of the symbolic expression e.

In some embodiments, the set of 'n' points from curve segmentation engine 242 are stored in database 252.

The output of curve segmentation 242 may include a list of sets (k, l, t, t') representing the intersections between the curve $r_k(t)$ at the point given by the parameter value t and the curve $r_l(t')$ at the point given by the parameter value t':

$$(k, t, l, t') \leftrightarrow r_k(t) r_l(t')$$

The list of intersections can include curve self-intersections for which k=l and t≠t'. The list may be stored in database 252 for access by server 230 or by the user through application 222 running on client device 210.

Figure 3A:
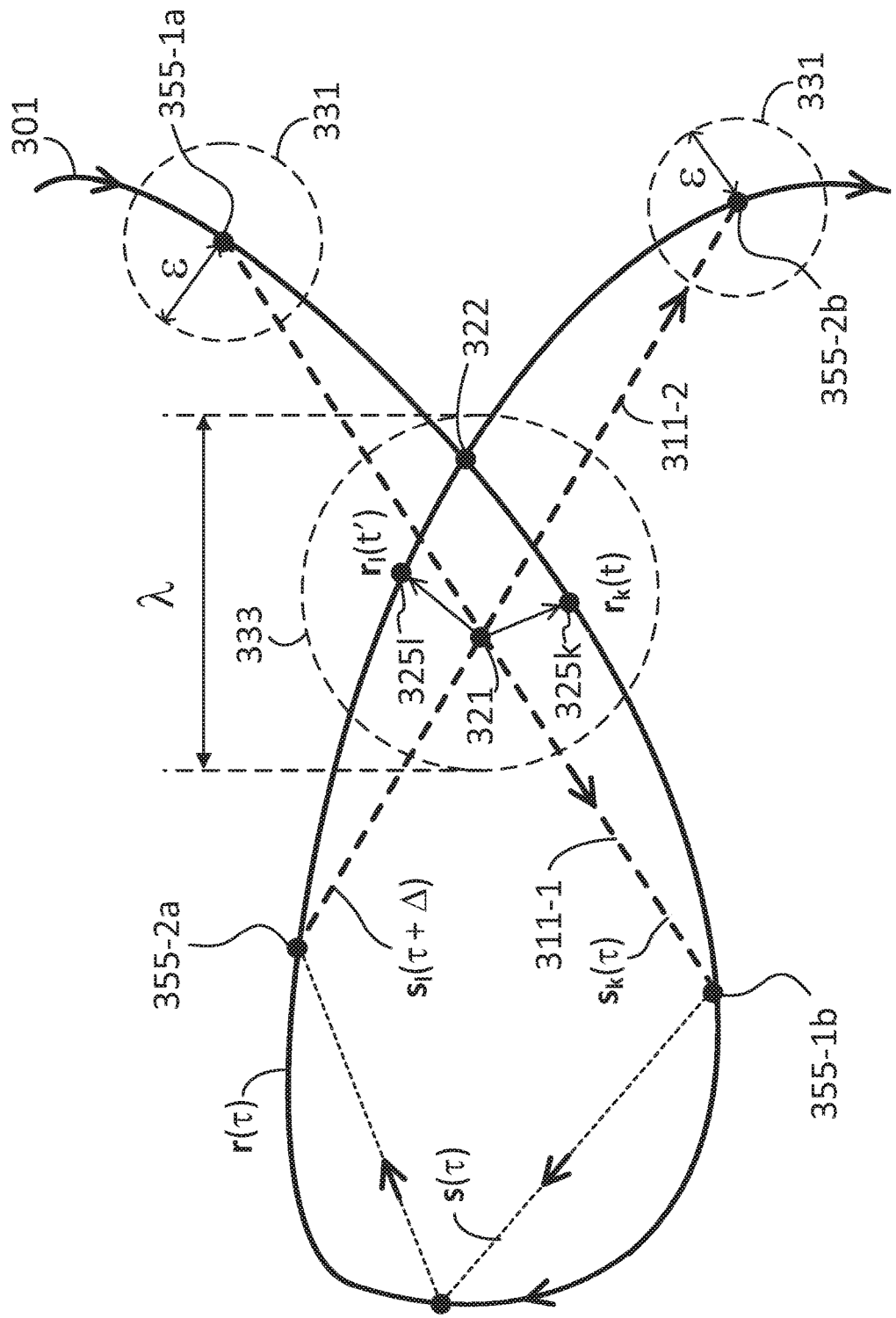
FIG. 3A illustrates a self-intersecting point in a parametric curve and an intersection point between two disconnected segments in a discretized segmentation of the parametric curve, according to some embodiments.

FIG. 3A illustrates a self-intersecting point 322 in a parametric curve 301 and an intersection point 321 between two disconnected segments 311-1 and 311-2 (hereinafter, collectively referred to as "intersecting segments 311") in a discretized segmentation of the parametric curve, according to some embodiments.

A segmented curve s(τ) includes multiple linear segments $s_i(\tau)$ provided by curve segmentation engine 242 based on an initial discretization tolerance, ε, such that any point within any of the multiple segments $s_i(\tau)$ is closer than ε to parametric curve 301, as indicated by circles 331. The segmentation of parametric curve r(t) leads to an initial set of curves $r_k(t)$ defined on parameter intervals $[t_{k1}; t_{k2}]$. Accordingly, each curve $r_k(t)$ is approximated by a set of discretized linear segments $s_k(\tau)$, (cf. Eq. 2.2) including intersecting segments 311, such that their maximum deviation from the curve is less than ε. Intersecting segments 311 ($s_k(\tau)$, and $s_l(\tau)$) are selected from the discretized linear segments, $s_i(\tau)$, based on a distance metric defined between them. In some embodiments, a distance between the discretized linear segments, $s_i(\tau)$, is defined as a "Manhattan" distance.

To find a distance, d, between segment 311-1 ($s_k(\tau)$) having end points 355-1a (with coordinates $x_1, y_1$) and 355-1b (with coordinates $x_2, y_2$), and segment 311-2 ($s_l(\tau)$) having end points 355-2a (with coordinates $x_3, y_3$) and 355-2b (with coordinates $x_4, y_4$), some embodiments may include a function LINE-SEGMENT-DISTANCE. LINE-SEGMENT-DISTANCE is a function of the eight coordinate values $(x_1, y_1, x_2, y_2, x_3, y_3, x_4, y_4)$, and may include the following equations as input:

$$x(t) = x_1 + (x_2 - x_1)t, y(t) = y_1 + (y_2 - y_1)t, t \in [0,1] \quad (3.1)$$

$$x'(t') = x_3 + (x_4 - x_3)t', y'(t') = y_3 + (y_4 - y_3)t', t' \in [0,1] \quad (3.2)$$

Wherein Eq. 3.1 describes segment 311-1 and Eq. 3.2 describes segment 311-2. The LINE-SEGMENT-DISTANCE function indicates whether the line segments are collinearly overlapping. In addition, the LINE-SEGMENT-DISTANCE function provides a minimum distance, d, between line segments 311 when they are not collinearly overlapping, and parameter values t and t', corresponding to a pair of points in distance d on the two segments. In the case of line segments 311, only one point is involved as d=0, so that parameter values t and t' indicate point 321 in Eqs. 3.1 and 3.2, respectively. The values t and t' define points 325k and 325l respectively (hereinafter, collectively referred to as "intersection points 325"), in curve 301. The distance between points 325k and 325l is within a precision 333 (a circle of diameter λ). In embodiments desiring a higher precision (smaller λ), intersection points 325 will converge to the "true" intersection point 322.

When intersecting segments 311 are not collinear, they may intersect at intersection point 321 defined by a first parameter value t and a second parameter value, t', such that:

$$s_l(\tau)=s_k(\tau) \quad (3.17)$$

A first point 325k in parametric curve 301 corresponds to $r_k(t)$, and a second point 325l, in parametric curve 301, corresponds to $r_l(t')$. The distance between first point 325k and second point 325l may define an error value, $\xi$, as follows $$\|r_l-r_s\|=\sqrt{(x_1(t_1)-x_s(t_s))^2+(y_1(t_1)-y_s(t_s))^2}<\xi \quad (3.18)$$

When the error value is less than a precision tolerance, $\lambda$, then intersection point 321 is included in a list of intersection points stored in a database (e.g., database 252). In some embodiments, rather than, or inclusive of, the coordinates of intersection point 321, the list of intersection points includes the values k, l, t, and t', which univocally identify points $r_l(t)$ and $r_k(t')$. Accordingly, without precisely finding intersection point 322, embodiments as disclosed herein may efficiently determine intersection point 321 and first and second points 325k and 325l, which may be adequately close to the true intersection point 322.

When the error value is greater than or equal to the precision tolerance, then a new discretization segmentation of parametric curve 301 is performed, for a smaller tolerance value, $\epsilon'<\epsilon$. For example, in some embodiments, the new tolerance value, $\epsilon'$, may be less than half of the previous tolerance value, $\epsilon$. More generally, the new tolerance value may be chosen as $\epsilon'=\eta\cdot\epsilon$, where $\eta\ll 1$ (e.g., $\eta=0.1$), and new intersection segments 311 are selected from a subset of curve segments containing first point 325k ($r_k(t)$), and second point 325l ($r_l(t')$), with interval parameters [t−Δt, t+Δt], and [t'−Δt', t'+Δt']; new parameter interval [t−Δt; t+Δt] for the curve $r_k(t)$. In some embodiments, $\Delta t=(\tau_{i+1}-\tau_i)/2$, and $\Delta t'=(\tau_{j+1}-\tau_j)/2$, where $r_k(\Box_i)$ defines point 355-1a, $r_k(\Box_{i+1})$ defines point 355-1b, $r_l(\Box_j)$ defines point 355-2a, and $r_l(\Box_{j+1})$ defines point 355-2b.

The relationship between segments 311 can be determined by considering the following system of two linear equations for two variables $$(x_2-x_1)\cdot t+(x_3-x_4)\cdot t'=x_3-x_1 \quad (3.3)$$

$$(y_2-y_1)\cdot t+(y_3-y_4)\cdot t'=y_3-y_1 \quad (3.4)$$

The system of Eqs. 3.3 and 3.4 has a determinant, D, defined as $$D=(x_2-x_1)\cdot(y_3-y_4)-(x_3-x_4)\cdot(y_2-y_1) \quad (3.5)$$

When D≠0, then segments 311 are not parallel and the system has a solution, to and to', given by $$to = \frac{(x_3-x_1)\cdot(y_3-y_4)-(y_3-y_1)\cdot(x_3-x_4)}{D} \quad (3.6)$$

$$to' = \frac{(y_3-y_1)\cdot(x_2-x_1)-(x_3-x_1)\cdot(y_2-y_1)}{D} \quad (3.7)$$

when D≠0 and to∈[0,1], and to'∈[0,1], then segments 311 intersect at point 321 and the function LINE-SEGMENT-DISTANCE returns the following information: collinearly overlapping segments=false; d=0; (t; t')=(to; to'), wherein to and to' indicate point 321.

If D≠0 and either to e [0,1] or to' e [0,1], or if D=0 and $$(x_3-x_1)\cdot(y_3-y_4)-(y_3-y_1)\cdot(x_3-x_4)\neq 0$$

$$(y_3-y_1)\cdot(x_2-x_1)-(x_3-x_1)\cdot(y_2-y_1)\neq 0 \quad (3.8)$$

then segments 311 may not intersect. In this case, the function LINE-SEGMENT-DISTANCE searches for the nearest pair of points on segments 311. To this effect, a minimum distance between a point (x; y) and a line through the points $(x_s; y_s)$ and $(x_e; y_e)$ may be defined. The line may be defined by the following expression $$x(\tau)=x_s+(x_e-x_s)\tau, y(\tau)=y_s+(y_e-y_s)\tau \quad (3.9)$$

The minimum distance is achieved for the nearest point on the line described by Eq. (3.8), corresponding to the value $\tau=\tau 0(x,y,x_s,y_s,x_e,y_e)$ given by $$\tau_0(x, y, x_s, y_s, x_e, y_e) = \frac{(x-x_s)(x_e-x_s)+(y-y_s)(y_e-y_s)}{\sqrt{(x-x_s)^2+(y-y_s)^2}\sqrt{(x_e-x_s)^2+(y_e-y_s)^2}} \quad (3.10)$$

When the nearest point on the line defined by Eq. 3.9 is between points $(x_s; y_s)$ and $(x_e; y_e)$, then τ0(x; y; $x_s$; $y_s$; $x_e$; $y_e$)∈[0; 1]. Otherwise we define τ(x; y; $x_s$; $y_s$; $x_e$; $y_e$) such that it corresponds to the value of parameter t at the closer one of the two end points $(x_s; y_s)$ and $(x_e; y_e)$.

$$\tau(x, y, x_s, y_s, x_e, y_e) = \begin{cases} 0, & \text{if } \tau_0(x, y, x_s, y_s, x_e, y_e) < 0 \\ 1, & \text{if } \tau_0(x, y, x_s, y_s, x_e, y_e) > 1 \\ \tau_0(x, y, x_s, y_s, x_e, y_e), & \text{otherwise} \end{cases} \quad (3.11)$$

Let us denote by $$\tau_1=\tau(x_1,y_1,x_3,y_3,x_4,y_4)$$

$$\tau_2=\tau(x_2,y_2,x_3,y_3,x_4,y_4)$$

$$\tau_3=\tau(x_3,y_3,x_1,y_1,x_2,y_2)$$

$$\tau_4=\tau(x_4,y_4,x_1,y_1,x_2,y_2) \quad (3.12)$$

The parameter values corresponding to the point on one segment (e.g., 311-1) that is nearest to one of the end points of the other line segment (e.g., 311-2). Let us further define $$\Delta x(\tau,\tau')=x_1+(x_2-x_1)\tau-x_3-(x_4-x_3)\tau'$$

$$\Delta y(\tau,\tau')=y_1+(y_2-y_1)\tau-y_3-(y_4-y_3)\tau'$$

$$\Delta(\tau,\tau')=\sqrt{(\Delta x(\tau,\tau'))^2+(\Delta y(\tau,\tau'))^2} \quad (3.13)$$

And denote by $$\Delta_1=\Delta(0,\tau_1)$$

$$\Delta_2=\Delta(1,\tau_2)$$

$$\Delta_3=\Delta(\tau_3,0)$$

$$\Delta_4=\Delta(\tau_4,1) \quad (3.14)$$

The distances between each end point of each segment 311 and the nearest point on the other segment. Let Δa and Δb be the smallest two of the four distances in Eq. 3.13, and let Δb not be smaller than Δa $$\Delta_a \leq \Delta_b \leq \Delta_c \leq \Delta_d, (a,b,c,d)\in 1,2,3,4$$

Two subcases may be considered:

(a) If Δa=0 and Δb=0, then there are two end points of segments 311 that at the same time lie on the other line segment. Segments 311 are collinearly overlapping in the region between the two points on the line segments corresponding to the values of parameters τa and τb. The function LINE-SEGMENT-DISTANCE therefore returns the following information:

collinearly overlapping segments=TRUE
d=0

$$-(t_a, t'_a) = \begin{cases} (0, \tau_1) & \text{if } a = 1 \\ (1, \tau_2) & \text{if } a = 2 \\ (0, \tau_3) & \text{if } a = 3 \\ (1, \tau_4) & \text{if } a = 4 \end{cases} \quad (3.15)$$

$$-(t_b, t'_b) = \begin{cases} (0, \tau_1) & \text{if } b = 1 \\ (1, \tau_2) & \text{if } b = 2 \\ (0, \tau_3) & \text{if } b = 3 \\ (1, \tau_4) & \text{if } b = 4 \end{cases} \quad (3.16)$$

(b) If Δa≠0 or Δb≠0, then there is at most one end point of segments 311 that at the same time lies on the other segment. Segments 311 are not collinearly overlapping and there is one point on one segment and one point on the other segment for which the minimum distance is reached. The function LINE-SEGMENT-DISTANCE therefore returns the following information:

collinearly overlapping segments=FALSE
d=Δa $$-(t, t') = \begin{cases} (0, \tau_1) & \text{if } a = 1 \\ (1, \tau_2) & \text{if } a = 2 \\ (\tau_3, 0) & \text{if } a = 3 \\ (\tau_4, 1) & \text{if } a = 4 \end{cases} \quad (3.17)$$

In some embodiments, the function LINE-SEGMENT-DISTANCE as described above may be implemented as

```
function LINE-SEGMENT-DISTANCE (x₁,y₁,x₂,y₂,x₃,y₃,x₄,y₄)
  D←(x₂-x₁)·(y₃-y₄)·(y₂-y₁)·(x₃-x₄)
  if D≠0 then
    t0←((x₃-x₁)·(y₃-y₄)·(y₃-y₁)·(x₃-x₄))/D
    t0' ←((y₃-y₁)·(x₂-x₁)·(x₃-x₁)·(y₂-y₁))/D
    if t0≥0 ∧t0≤1∧t0'0∧t0'≤1 then
      distance.colinearoverlap←FALSE
      distance.d←0
      distance.t1←t0
      distance.t2←t0'
      return distance
    end if
  end if
  τ[1]←TAU(x₁,y₁,x₃,y₃,x₄,y₄)
  τ[2]←TAU(x₂,y₂,x₃,y₃,x₄,y₄)
  τ[3]←TAU(x₃,y₃,x₁,y₁,x₂,y₂)
  τ[4]←TAU(x₄,y₄,x₁,y₁,x₂,y₂)
  Δ[1]←DISTANCE(0, τ1)
  Δ[2]←DISTANCE(1, τ2).
  Δ[3]←DISTANCE(τ3, 0)
  Δ[4]←DISTANCE(τ4, 1)
  for i←1,4 do
    index[i]←i
  end for
  s←sort(index, Δ[i1]<Δ[i2])
  a←index[1]
  b←index[2]
  if Δa=0∧Δb=0 then
    distance.colinearoverlap←TRUE
    distance.d←0
    if a=1∨a=3 then
      distance.ta1←0
    else
      distance.ta1←1
    end if
    distance:ta2←t[a]
    if b=1∨b=3 then
      distance:tb1←0
    else
      distance.tb1←1
    end if
    distance.tb2←τ[b]
  else
    distance.colinearoverlap←FALSE
    distance.d←Δ[a]
    if a=1 then
      distance.t1←0
      distance.t2←τ1
    else if a=2 then
      distance.t1←1
      distance.t2←τ2
    else if a=3 then
      distance.t1←τ3
      distance.t2←0
    else
      distance.t1←τ4
      distance.t2←1
    end if
  end if
  return distance
end function
```

The function DISTANCE used above is defined as

```
function DISTANCE(τ, τ',x₁, y₁, x₂, y₂, x₃, y₃, x₄, y₄)
  Δx←x₁+(x₂-x₁)·τ-x₃-(x₄-x₃)·τ'
  Δy←y₁+(y₂-y₁)·τ-y₃-(y₄-y₃)·τ'
  return Δ←√((Δx)²+(Δy)²)
end function
``` and the function TAU used above is defined as

```
function TAU(x, y, xₛ, yₛ, xₑ, yₑ)
  s←(x-xₛ)·(xₑ-xₛ)+(y-yₛ)·(yₑ-yₛ)
  n1←√((x-xₛ)²+(y-yₛ)²)
  n2←√((xₑ-xₛ)²+(yₑ-yₛ)²)
  τ0←s/(n1n2)
  if τ0<0 then
    τ←0
  else if τ0>1 then
    τ←1
  else
    τ←τ0
  end if
  return τ
end function
```

Figure 3B:
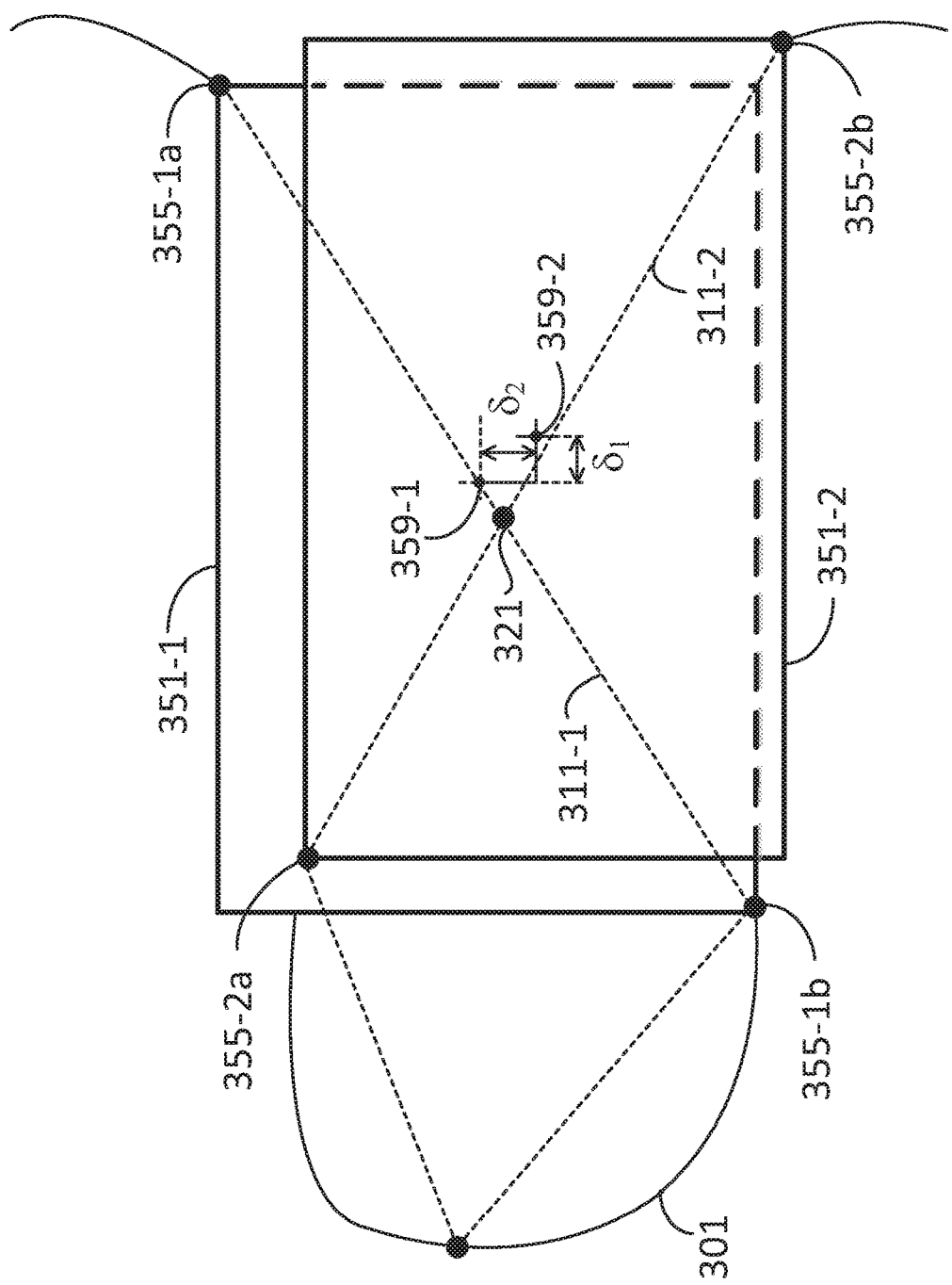
FIG. 3B illustrates the Manhattan distance between the two disconnected segments in FIG. 3A, according to some embodiments.

FIG. 3B illustrates the Manhattan distance, $\delta_1 + \delta_2$, between the two disconnected segments 311-1 and 311-2, according to some embodiments. The Manhattan distance is measured as the sum of a horizontal distance (e.g., $\delta_1$, along the X-axis in the XY-plane) and a vertical distance (e.g., $\delta_2$, along the Y-axis in the XY-plane) between the centroids 359-1 and 359-2 of bounding rectangles 351-1 and 351-2 (hereinafter, collectively referred to as "bounding rectangles 351"), respectively. Bounding rectangles 351 are formed with segments 311 as diagonals. Accordingly, bounding rectangle 351-1 forms abound over segment 311-1, and bounding rectangle 351-2 forms a bound over segment 311-2. In some embodiments, intersecting segments 311 are selected when $\delta_1+\delta_2 \leq 2\varepsilon$, with $\varepsilon$ being the discretization tolerance for the segmentation of parametric curve 301.

In some embodiments, a NEIGHBORING-LINE-SEGMENT-PAIRS function returns the list of pairs of those segments $s_i(t)$ whose bounding rectangles are within the Manhattan distance of not more than $2\varepsilon$ from each other. The function NEIGHBORING-LINE-SEGMENT-PAIRS(segments, $\varepsilon$) takes a list of segments 311 defined by their end points as input (e.g., from curve segmentation engine 242) and in some embodiments may be disclosed as

```
function NEIGHBORING-LINE-SEGMENT-PAIRS(segments, ε)
    rectangles←empty-list
    for s∈segments do
        rectangle.x1←min(s.x1, s.x2)−ε
        rectangle.y1←min(s.y1, s.y2)−ε
        rectangle.x2←max(s.x1, s.x2)+ε
        rectangle.y2←max(s.y1, s.y2)+ε
        rectangle.segment←s
        append(rectangles, rectangle)
    end for
    pairs←empty-list
    for rpair 2 overlapping-rectangle-pairs(rectangles) do
        pair:segment1←rpair:rectangle1.segment
        pair:segment2←rpair:rectangle2.segment
        append(pairs, pair)
    end for
    return pairs
end function
```

The function overlapping-rectangle-pairs can be implemented using the sweep line algorithm:

```
Function OVERLAPPING-RECTANGLE-PAIRS(rectangles)
    sweeps←EMPTY-LIST
    for rectangle∈rectangles do
        sweep.insert←true
        sweep.x←rectangle.x1
        sweep.rectangle←rectangle
        append(sweeps, sweep)
        sweep.insert←false
        sweep.x←rectangle.x2
        sweep.rectangle←rectangle
        APPEND(sweeps, sweep)
    end for
    tree←empty-interval-tree
    pairs←empty-list
    for sweep∈SORT(sweeps, (s1.x<s2.x)∨
        (s1.insert∧¬s2.insert)) do
        interval.lower←sweep:rectangle.y1
        interval.higher←sweep:rectangle.y2
        if sweep.insert then
            for overlap∈INTERVAL-TREE-OVERLAPS(tree, interval) do
                APPEND(pairs, overlap.object, sweep.rectangle)
            end for
            INTERVAL-TREE-INSERT(tree, interval, sweep.rectangle)
        else
            INTERVAL-TREE-REMOVE(tree, sweep.rectangle)
        end if
    end for
    return pairs
end function
```

The three functions INTERVAL-TREE-OVERLAPS, interval-tree-insert and INTERVAL-TREE-REMOVE implement the functionality of the binary interval search tree in which each node has the following elements and properties:

node.lower, containing the lower boundary of the closed interval.

node.upper, containing the upper boundary of the closed interval.

node.left, pointing to the subtree of nodes n such that n.lower<node.lower.

node.right, pointing to the subtree of nodes n such that n.lower≥node.lower.

node.max, containing the maximum value n:upper of all nodes n in the subtrees pointed to by node.left and node.right.

node.object, containing the object associated with the node.

The three functions listed above are assumed to exist and to be defined as follows:

INTERVAL-TREE-INSERT(tree, interval, object) inserts a new node n with n.interval=interval and n.object=object in the tree.

INTERVAL-TREE-REMOVE(tree, object) removes the node n for which n:object=object from the tree.

INTERVAL-TREE-OVERLAPS(tree, interval) returns the list of all nodes n in the tree for which (n.lower≤ interval.higher)∧(n.higher)≥interval.lower).

Figure 3C:
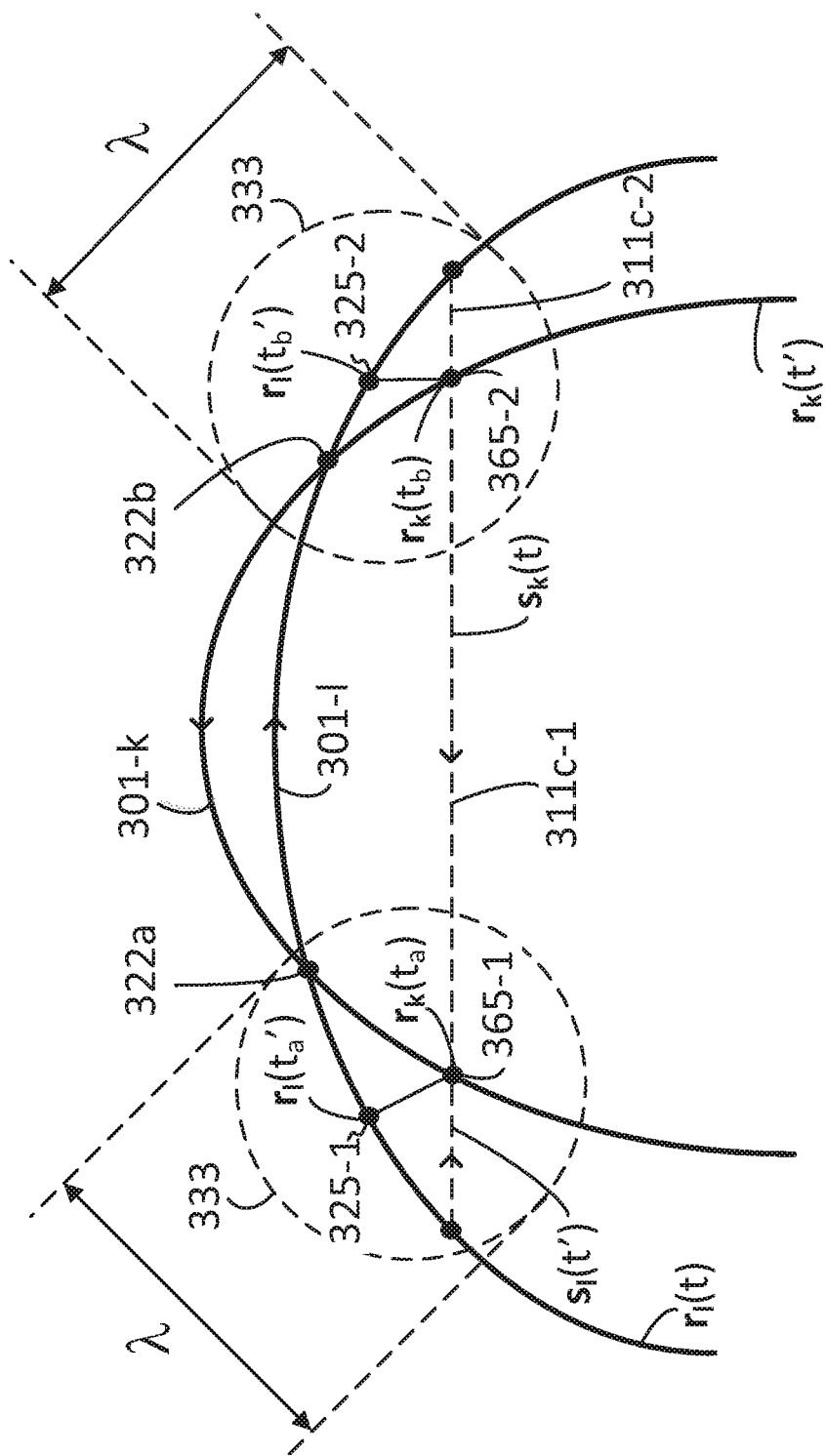
FIG. 3C illustrates intersection points between two parametric curves including collinearly overlapping segments in a discretized segmentation of the parametric curves, according to some embodiments.

FIG. 3C illustrates intersection points between two parametric curves 301-$k$ and 301-$l$ including segments $r_k(t')$ and $r_l(t)$, respectively. Each of the curve segments is discretized by collinearly overlapping segments $s_k(t)$ 311$c$-1 and $s_l(t)$ 311$c$-2 (hereinafter, collectively referred to as "collinearly overlapping segments 311$c$") respectively, according to some embodiments. In some embodiments, the LINE-SEGMENT-DISTANCE function described above may also indicate that two input segments, $s_k(t)$ and $s_l(t)$ are collinearly overlapping.

In some embodiments, a first point 365-1 ($r_k(t_a)$) in an overlapping segment between collinearly overlapping segments 311$c$ may be related to a first parameter value $t_a$ and a second parameter value $t_a'$ such that $s_k(t_a)=s1(t_a')$. A second point 365-2 ($r_k(t_b)$) in the overlapping segment may be related to a third parameter to and a fourth parameter $t_b'$ such that $s_k(t_b)=s_l(t_b')$. Accordingly, a first point 325-1 may be found as $r_l(t_a')$, and a second point 325-2 may be found as $r_l(t_b')$.

When the distance between point 321-1 and point 365-1 is less than the given precision 333 ($\lambda$), then the parameters (k; $t_a$; l; $t_a'$) are stored in the list of intersections. When the distance between point 321-2 and point 365-2 is less than the given precision 333 ($\lambda$), then parameters (k; t; l; t') are stored in the list of intersections. Note that, as $\lambda$ tends to zero, points 325-1 and 365-1 converge to a true intersection point 322$a$. Likewise, as $\lambda$ tends to zero, points 325-2 and 365-2 converge to a true intersection point 322$b$.

FIGS. 4A-B illustrate a discretization segmentation of a first parametric curve 401 and a second parametric curve 402, according to some embodiments. First parametric curve 401 is an elliptic arc defined by $$x_1(t)=50\cos(t)$$

$$y_2(t)=94+100\sin(t)$$

$$t\in[-\pi/2-\tfrac{1}{2},-\pi/2+\tfrac{1}{2}]$$ (4.1)

And the second parametric curve 402 is a cosine curve of variable frequency $$x_2(t)=5t+100t^3$$

$$y_2(t)=30+10\cos(100t)$$

$$t\in[-0.6, 0.6] \tag{4.2}$$

In some embodiments, a user may provide parametric curves 401 and 402 to a curve segmentation engine in a server, via an application running in a client device (e.g., client device 210, application 222, server 230, and curve segmentation engine 242). True intersection points 422 are illustrated, and may be obtained by solving for a value of t intersecting the two intervals and equalizing the right hand side of Eqs. 4.1 with the right hand sides of Eqs. 4.2.

Figure 5A:
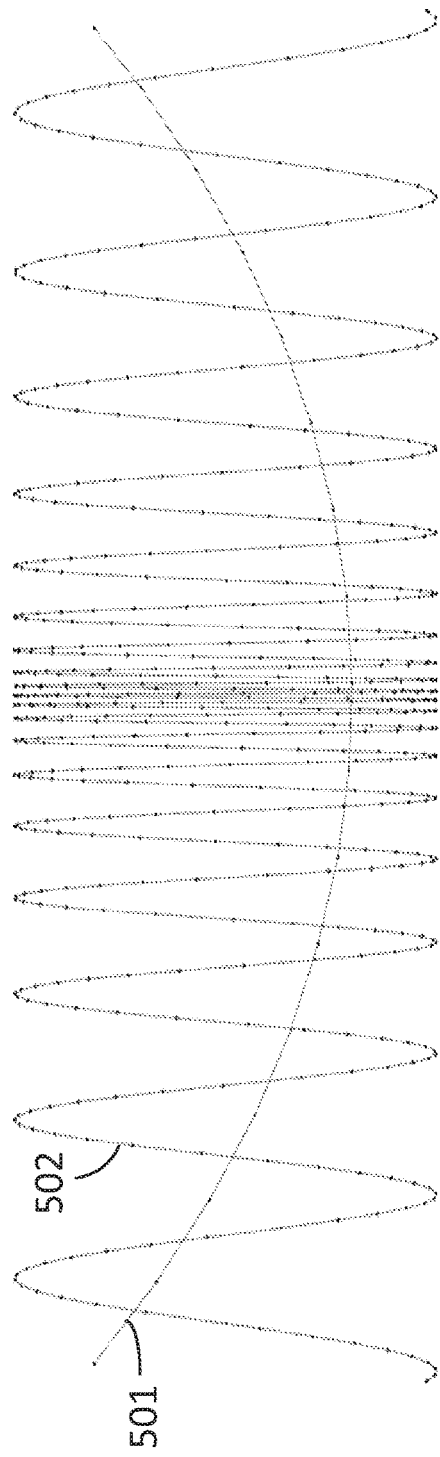
FIGS. 5A and 5B illustrate a discretization segmentation of the first and second parametric curves of FIGS. 4A and 4B, according to some embodiments.
Figure 5B:
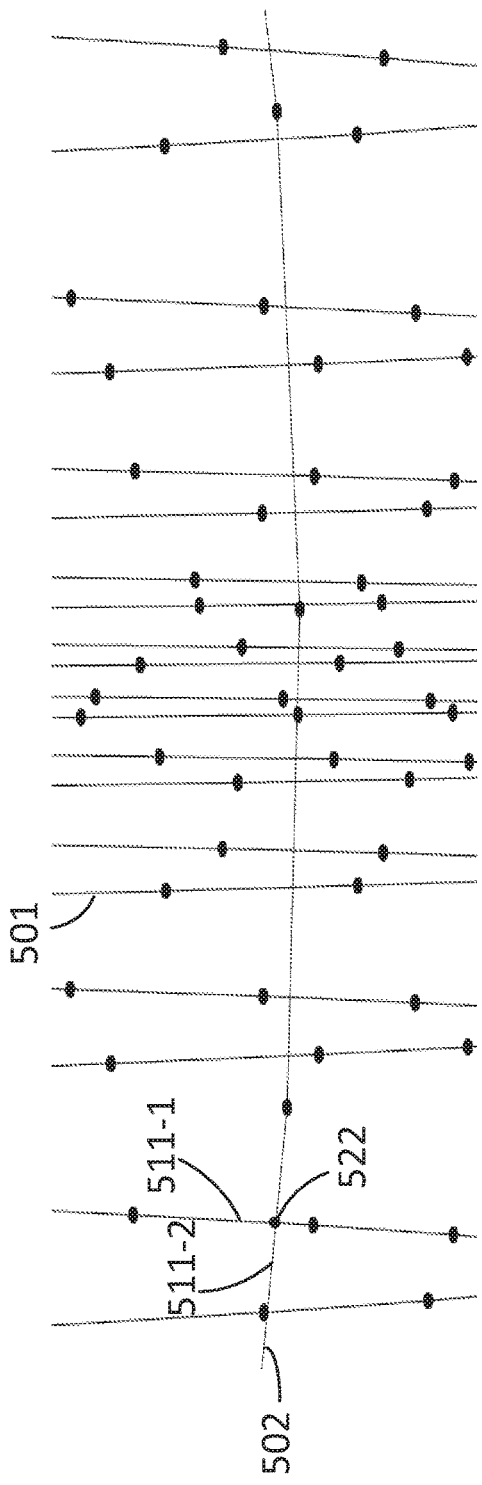

FIGS. 5A-B illustrate multiple intersection points between the first parametric curve 401 and the second parametric curve 402, according to some embodiments. Parametric curves 401 and 402 are shown discretized into segmented curves 501 and 502, respectively. Intersection points 522 are obtained between segments 511-1 from segmented curve 501, and segments 511-2 from segmented curve 502. With the discretization tolerance ε=0.1 at two different magnification. In some embodiments, segmented curves 501 and 502 are provided to the client device by the curve segmentation engine based on parametric curves 401 and 402, and the discretization tolerance, ε.

The circles in FIGS. 5A-B have the diameter equal to ε and indicate the discretization points. Since the same initial value of the discretization tolerance ε=0.1 has been used for finding the intersections, the line segments between the discretization points correspond exactly to the initial set of segments by which the intersection finding algorithm is started. One can see that each of the segments on the elliptic arc intersects with multiple segments on the cosine curve and that the density of the intersection points increases towards the center. Nevertheless, since the discretization tolerance and thus the size of the segments is recursively decreased until the intersection points are determined with precision, δ, eventually each of the intersection points is found by the method.

The discretized curves 501 and 502 are shown again together with the intersection points which have been determined with the precision $\lambda=10^{-8}$. As one can see, all of the intersections have been correctly found.

FIGS. 6A-B illustrate multiple intersection points 622 between a first parametric curve 601 and a family of rectilinear curves 602-1, 602-2, 602-3, 602-4, 602-5, 602-6, and 602-7 (collectively referred, hereinafter, as "curves 602") having a different slope. Curves 602 also have in common the center of parametric curve 601, according to some embodiments. Parametric curve 601 may be defined as $$x_1(t) = t - \frac{10t}{(1+t^2)^2} \tag{6.1}$$

$$y_1(t) = \arctan(t)$$

$$t \in [-10, 10]$$

And curves 602 with different slopes through the origin (0,0) may be described as $$x_s(t)=st$$

$$y_s(t)=t$$

$$s\in[-9.001, -9, -8.999, -8.99, -8.9, -8, -6, -4, -2, 0, 2, 4]$$

$$t\in[-2,2] \tag{6.2}$$

With the slope, s, defining each individual curve. In some embodiments, it is desirable to find the intersections between the curves defined by Eqs. 6 with a precision $\delta=10^{-10}$, which may also be the tolerance value for the discretized segmentation of the curves. Since the S-shaped curve also passes through the origin (0, 0) with the slope $y'_1(0)/x'_1(0)=-9$ each of the lines with s>−9 intersects it at the origin (0; 0) and at two other points. For s=−8:999 the line and the S-shaped curve are almost tangential and cannot be distinguished from each other at given magnification, nevertheless even in this case the two intersections are clearly visible and placed perfectly symmetrical around the origin. The line with s=−9:001 only intersects the S-shaped curve at one point at the origin; therefore, a corresponding section between the intersection points doesn't exist and isn't shown. For s=9 the line is exactly tangential to the S-shaped curve and mathematically only intersecting it at one point at the origin. However, due to the finite numerical precision $\lambda=10^{-10}$ few of the points on the curves very close to the origin are also identified as intersections. Nevertheless, even in these cases the distance between the points on both curves is less than δ.

Figure 7:
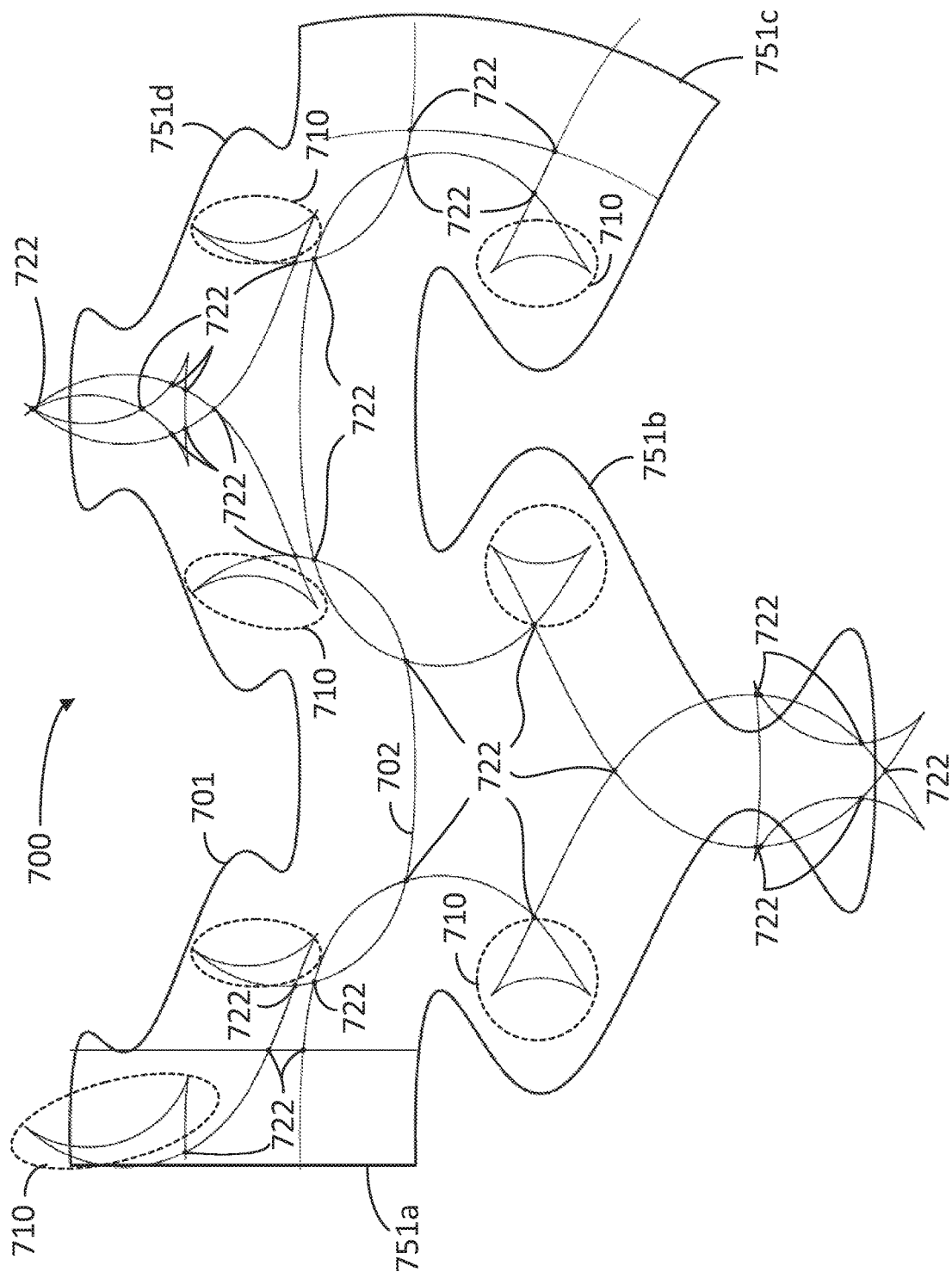
FIG. 7 illustrates multiple intersection points and self-intersection points between a first parametric curve and a parallel curve forming the outline of a feature in an integrated circuit design, according to some embodiments.

FIG. 7 illustrates multiple self-intersection points 722 between a first parametric curve 701 and a parallel curve 702 forming the outline of a feature 700 in an integrated circuit design, according to some embodiments. Parallel curve 702 may result from an offset (e.g., by a distance D=−10, cf. parallel offset 105) of boundary curves derived by offsetting the boundary defined by:

Line 751a $$x_1(t)=-50$$

$$y_1(t)=-t \tag{7.1}$$

First sinusoidal curve 751b $$x_2(t)=t+8\sin(0.4t)$$

$$y_2(t)=-20+20\sin(0.1t) \tag{7.2}$$

Circular arc 751c $$x_3(t)=50\cos(t)$$

$$y_3(t)=50\sin(t) \tag{7.3}$$

And second sinusoidal curve 751d $$x_2(t)=-t-4\sin(0.4t)$$

$$y_2(t)=20-10\sin(0.1t) \tag{7.2}$$

The intersections and self-intersections of the offset curves are shown as small circles. Some of the self-intersections of the curves are between the curve sections adjacent to the cusp points created where the curvature of the original curve is equal to −1/D=0.1. The cusp points themselves have been identified as spurious intersection points and removed from the set of intersection points.

The offset curves forming parallel line 702 of the boundary curves, including circular arcs created by offsetting the vertex points between the boundary curves, are shown as thin lines. The intersection points are indicated by small filled circles.

Figure 8B:
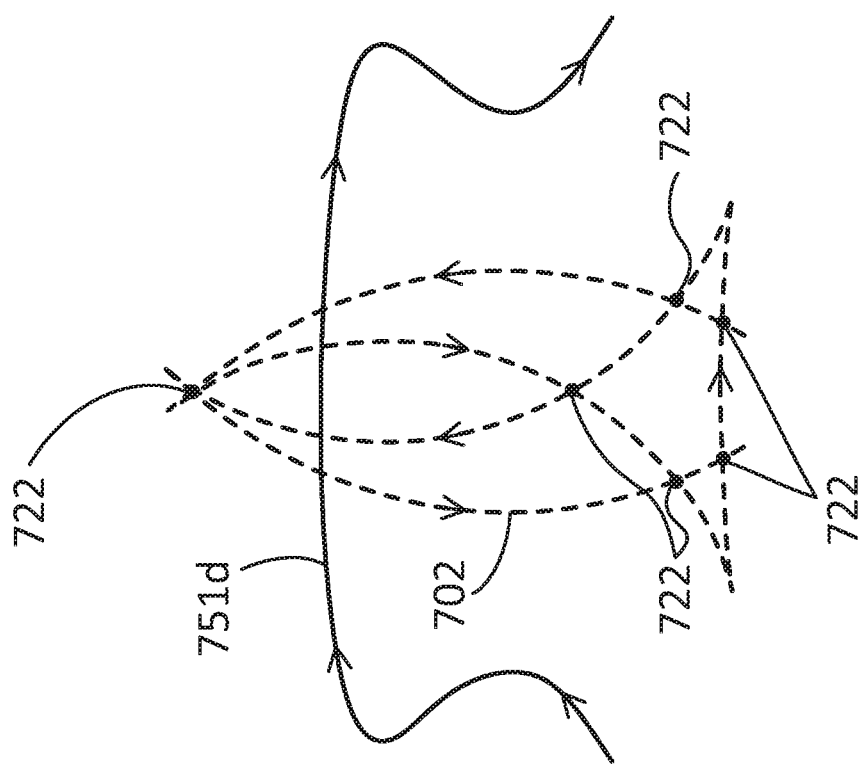
FIGS. 8A and 8B illustrate a detailed view of multiple self-intersection points in FIG. 7, according to some embodiments.
Figure 8A:
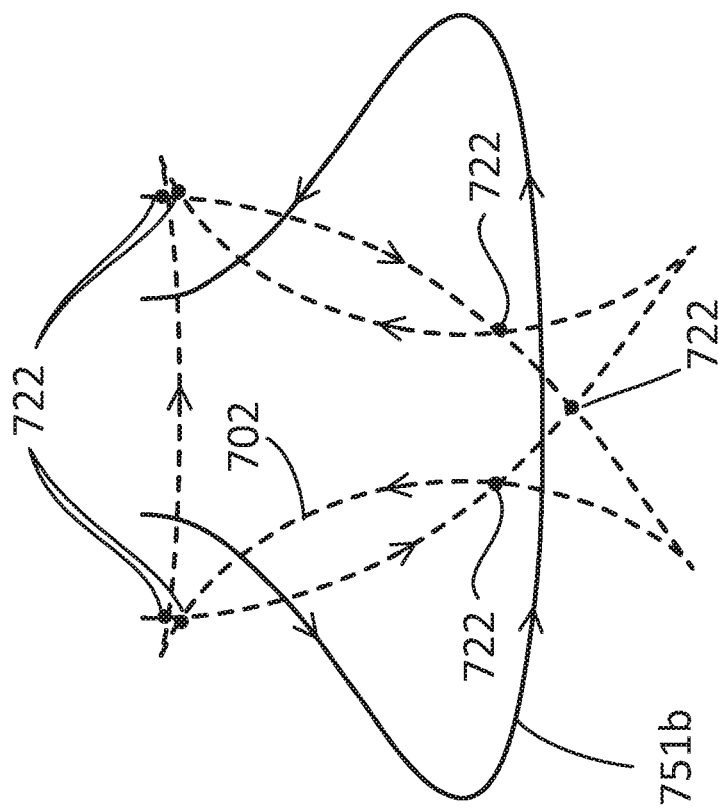

FIGS. 8A-B illustrate a detailed view of multiple self-intersection points 722, according to some embodiments.

FIG. 8A illustrates an enlarged portion of curve section 751b around x=−15 and y=−35 with 7 self-intersection points.

FIG. 8B illustrates an enlarged portion of curve section 751d around x=15 and y=25 with 9 self-intersection points.

Figure 8C:
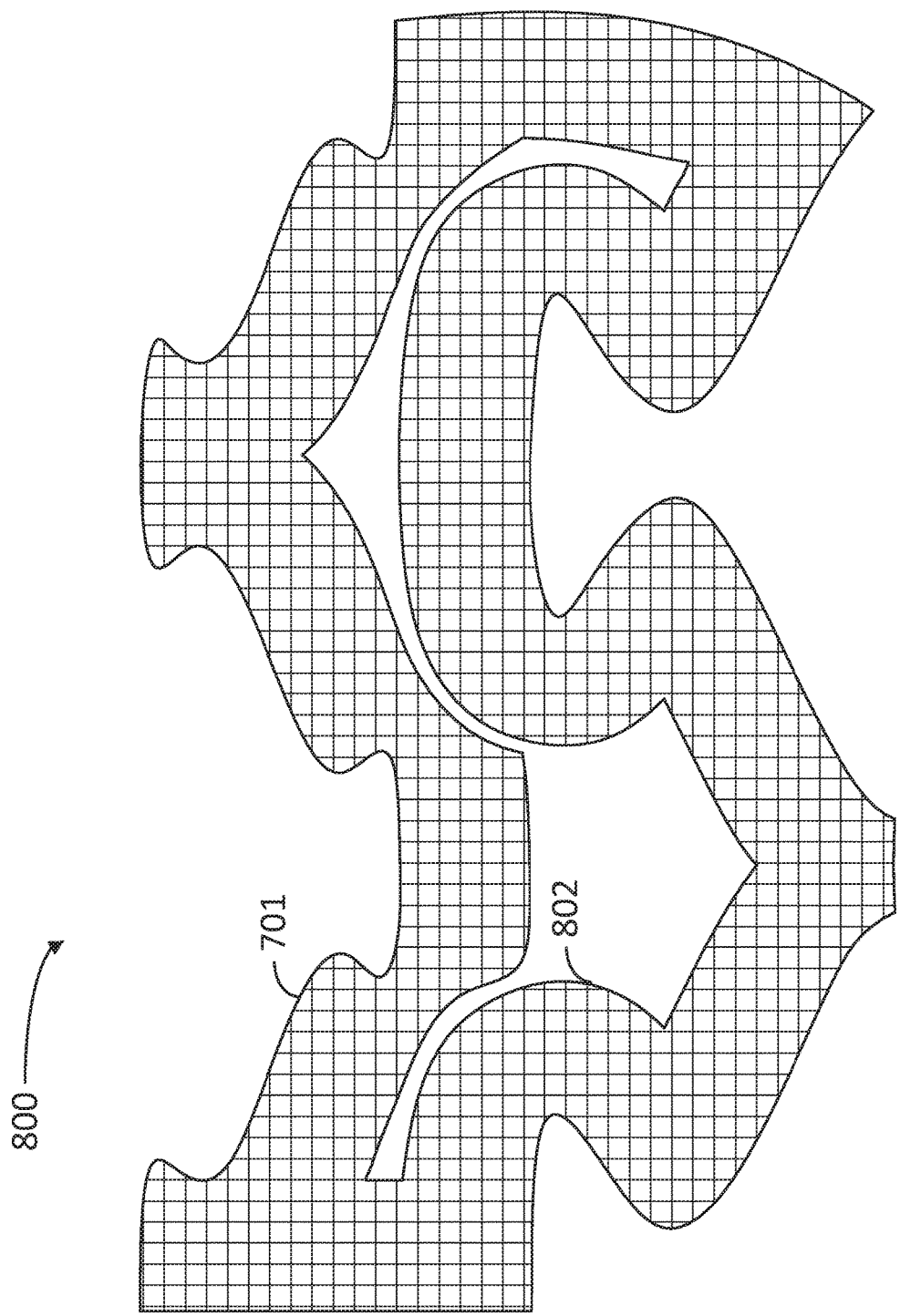
FIG. 8C illustrates a feature for manufacturing a mask to reproduce the feature in an IC circuit, the feature being outlined by the first parametric curve and the parallel curve in FIG. 7, according to some embodiments.

FIG. 8C illustrates a feature 800 for manufacturing a mask to reproduce the feature in an IC circuit, the feature being outlined by parametric curve 701 and parallel curve 702, according to some embodiments. Accordingly, feature 800 is resolved between parametric curve 701 and parallel curve 802 after identifying the intersecting points 722 to remove loops 710. As disclosed herein, parallel curve 802 results from parallel curve 702 with loops 710 removed, clear intersection points 722.

Figure 9:
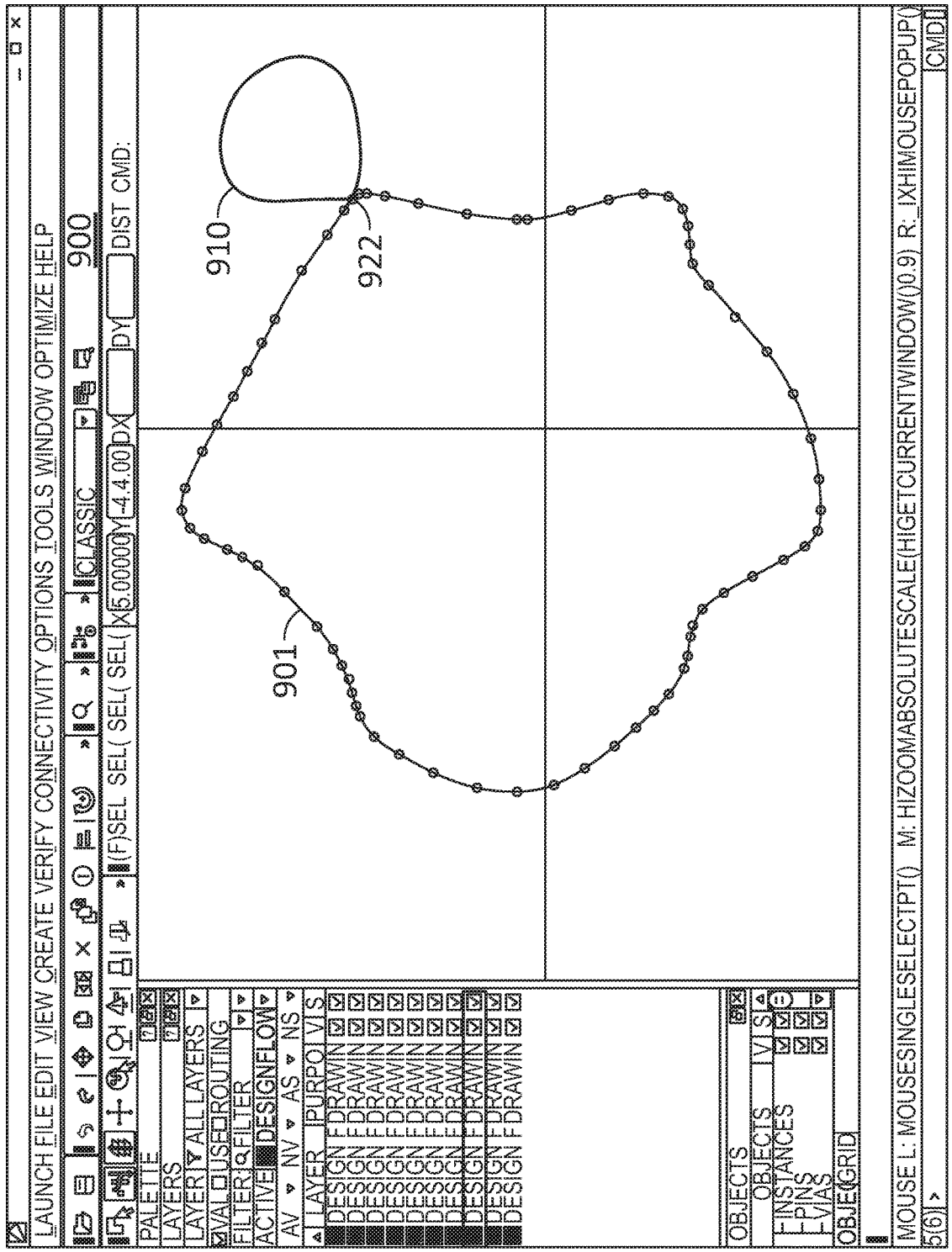
FIG. 9 illustrates a screen shot of an application to find intersection points between lines of arbitrary shape, according to some embodiments.

FIG. 9 illustrates a screen shot 900 of an application to find intersection points 922 between parametric curves of arbitrary shape, according to some embodiments. When self-intersecting point 922 is found, the user may select loop 910 for removal from the discretized segmentation of parametric curve 901, and provide the resulting discretized segmentation to a mask manufacturer so that the curve is printed into an IC.

Figure 10:
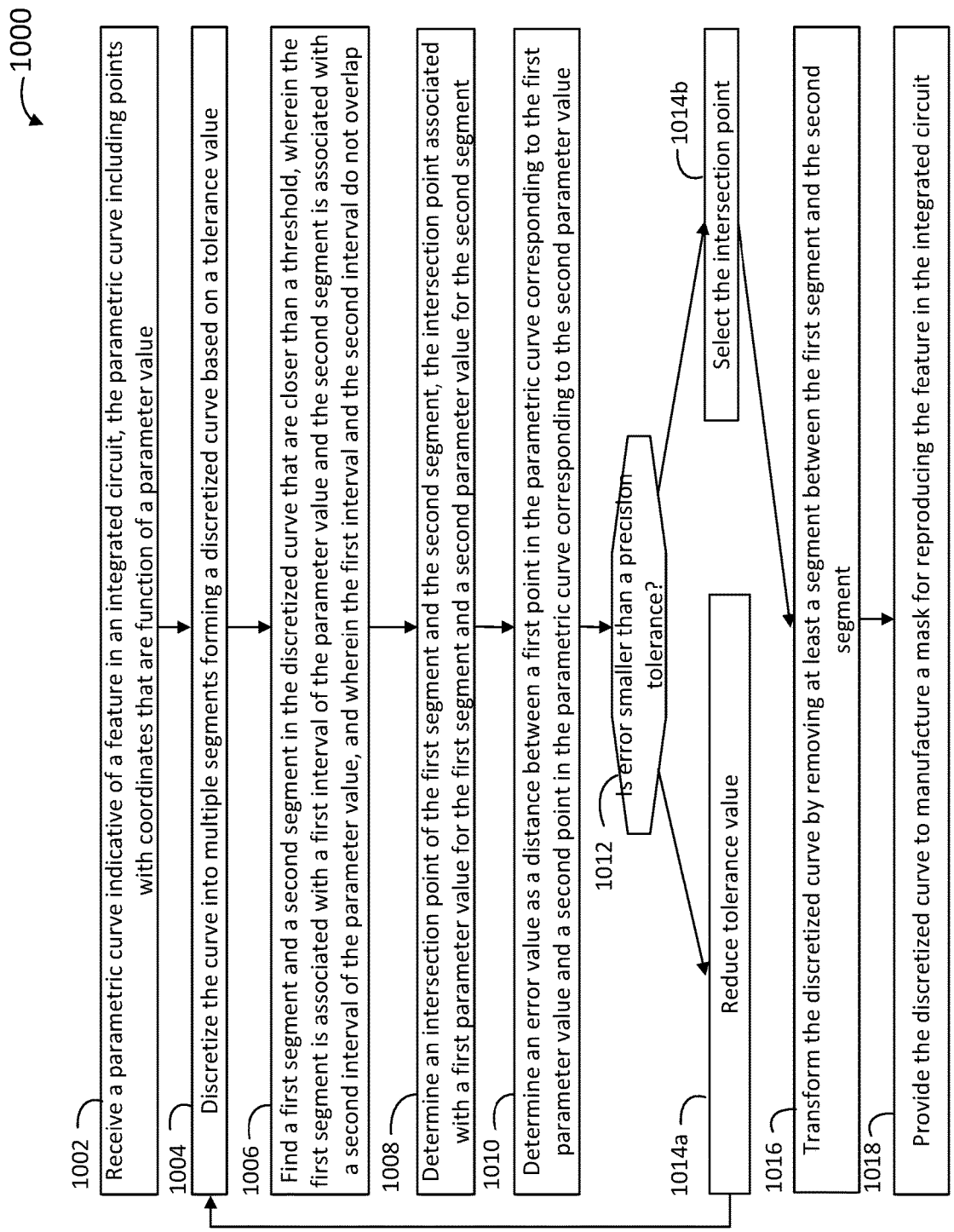
FIG. 10 is a flow chart illustrating steps in a method for finding intersection points of planar parametric curves, according to some embodiments.

FIG. 10 is a flow chart illustrating steps in a method 1000 for finding intersection points of planar parametric curves, according to some embodiments. At least some of the steps in method 1000 may be performed by a computer having a processor executing commands stored in a memory of the computer (e.g., processors 212 and 236, memories 220 and 232). Further, steps as disclosed in method 1000 may include retrieving, editing, and/or storing files in a database that is part of, or is communicably coupled to, the computer (e.g., database 252). Methods consistent with the present disclosure may include at least some, but not all, of the steps illustrated in method 1000, performed in a different sequence. Furthermore, methods consistent with the present disclosure may include at least two or more steps as in method 1000, performed overlapping in time, or almost simultaneously.

In some embodiments, at least one or more of the steps in method 1000 may be performed in a cloud computing environment, wherein a computer may include servers, such as a master server and a slave server. Accordingly, at least some of the steps illustrated in method 1000 may be performed in parallel in different processors, following separate computational threads. For example, each of the separate computational threads may be performed by at least one of the slave servers in each of multiple applications and processors dedicated to the specific computational thread.

Step 1002 includes receiving a parametric curve indicative of a feature in an integrated circuit, the parametric curve including points with coordinates that are a function of a parameter value. In some embodiments, step 1002 includes selecting a point along a normal to a generator curve, the point separated by a selected distance from the generator curve to form the parametric curve, wherein the feature in the integrated circuit is bound between the generator curve and the parametric curve.

In some embodiments, step 1002 further includes selecting a point along a normal to a generator curve, the point separated by a selected distance from the generator curve to form the parametric curve, wherein the first segment belongs to a discretized segmentation of the generator curve and the second segment belongs to a discretized segmentation of the parametric curve.

Step 1004 includes discretizing the curve into multiple segments forming a discretized curve based on a tolerance value.

Step 1006 includes finding a first segment and a second segment in the discretized curve that are closer than a threshold. The first segment is associated with a first interval of the parameter value and the second segment is associated with a second interval of the parameter value. In some embodiments, the first interval and the second interval do not overlap.

In some embodiments, the first segment and the second segment are collinearly overlapping, and step 1006 further includes determining an intersection point as a first point in an overlapping segment formed between the first segment and the second segment when the error value is smaller than the precision tolerance.

Step 1008 includes determining an intersection point of the first segment and the second segment, the intersection point associated with a first parameter value for the first segment and a second parameter value for the second segment.

Step 1010 includes determining an error value as a distance between a first point in the parametric curve corresponding to the first parameter value and a second point in the parametric curve corresponding to the second parameter value. In some embodiments, step 1010 includes reducing the tolerance value for the discretized curve when the error value is larger than the precision tolerance.

Step 1012 includes querying whether the error is smaller than a precision tolerance. When the error is smaller than the threshold according to step 1012, step 1014a includes reducing the tolerance value and repeating method 1000 from step 1004. When the error is larger than, or equal to the threshold according to step 1012, step 1014b includes selecting the intersection point.

In some embodiments, step 1014b may include determining whether an intersection point stored in the database (e.g., including the newly selected intersection point) corresponds to a stationary point. A stationary point may be identified as a point $r_k(to, to')$ such that the curve derivatives $x'_k(t)$ $(=dx_k/dt)$ and $y'_k(t)$ $(=dy_k/dt)$ vanish or nearly vanish at the intersection point (where $x_k(to) \approx x_k(to')$ and $y_k(to) \approx y_k(to')$).

$$|to-to'|(\sqrt{x'_k(to)^2 + y'_k(to)^2} + \sqrt{x'_k(to')^2 + y'_k(to')_2}) < 2\epsilon \qquad (10.18)$$

Accordingly, step 1014b may include removing from the list any points with k=1 corresponding to spurious self-intersections of the curve that include stationary points.

Step 1016 includes transforming the discretized curve by removing at least a segment between the first segment and the second segment. Accordingly, in some embodiments, step 1016 includes modifying a register in the memory of the computer by removing the coordinate values from at least a first and a second nodes in the segment to be removed between the first segment and the second segment. In some embodiments, step 1016 includes removing, from the discretized curve, at least a segment that is between the first segment and the second segment. In some embodiments, step 1016 includes removing all segments between the first segment and the second segment, removing a portion of the first segment after the intersection point, and removing a portion of the second segment that is before the intersection point, according to the parameter value. In some embodiments, step 1016 includes finding a third segment in the discretized curve that is closer to the first segment than the threshold, and determining a second intersection point between the first segment and the third segment. In some embodiments, the second segment belongs to a discretized segmentation of a second parametric curve, and step 1016 includes removing a segment between the intersection point of the first segment and the second segment and a second intersection point between the parametric curve and the second parametric curve. In some embodiments, step 1016 includes receiving a user input selecting the segment.

Step 1018 includes providing the discretized curve to manufacture a mask for reproducing the feature in the integrated circuit.

In some embodiments, the above steps in method 1000 may be included in a series of code functions to compute intersections between K curves (cf. Eq. 2.1) with initial discretization tolerance $\varepsilon$, reduction factor $\eta$, precision $\lambda$, Taylor series expansion order m and correlation factor $\beta$. The result is a list of objects of type intersection with components intersection.c1, intersection.c2 containing the array indices of the intersecting curves and intersection.t1, intersection.t2 containing the parameter values of curve functions at the intersection.

```
function INTERSECTIONS(x, y, t₁, t₂, K, ε, η, λ, m, β)
    I←EMPTY-LIST
    I←CURVE-INTERSECTIONS(x, y, t₁, t₂, K, ε, η, λ, m, β, I)
    I←REMOVE-DUPLICATES(I)
    I←REMOVE-SPURIOUS-INTERSECTIONS(I, x, y, ε)
    return I
end function
```

The function intersections calls the function curve-intersections which recursively finds the intersections between curves and appends them to the list of all intersections:

```
function CURVE-INTERSECTIONS(x, y, t₁, t₂, K, ε, η, λ, m, β)
    segments EMPTY-LIST
    for k ← 1,K do
        τ[k] ← DISCRETIZATION(x[k], y[k], t₁[k], t₂[k], m, ε, β)
        for i ← 1; LENGTH(τ[k]) − 1 do
            segment.x1 ← EVALUATE(x[k](τ[k][i]))
            segment.y1 ← EVALUATE(y[k](τ[k][i]))
            segment.x2 ← EVALUATE(x[k](τ[k][i + 1]))
            segment.y2 ← EVALUATE(y[k](τ[k][i + 1]))
            segment.dt ← (τ[k][i + 1] − τ[k][i])=2
            segment.index ← i
            segment. curve ← k
            APPEND(segments, segment)
        end for
    end for
    for pair ∈ NEIGHBORING-LINE-SEGMENT-PAIRS
        (segments, ε) do
        s1 ← pair:segment1
        s2 ← pair:segment2
        distance ← LINE-SEGMENT-DISTANCE(s1,s2)
        c ← distance.colinearoverlap
        if (s1.curve ≠ s2.curve) ∨ (|js1.index − s2.index| > 1) ∨ ¬c
            then
            if ¬c then
                x₁ ← x[k](distance.t1)
                y₁ ← y[k](distance.t1)
                x₂ ← x[k](distance.t2)
                y₂ ← y[k](distance.t2)
                if √((x₁−x₂)²+(y₁−y₂)²) < λ then
                    intersection.c1 ← s1.curve
                    intersection.c2 ← s2.curve
                    intersection.t1 ← distance.t1
                    intersection.t2 ← distance.t2
                    APPEND(I, intersection)
                else
                    x'[1] ← x[s1.curve]
                    t'₁[1] ← distance.t1 − s1.dt
                    t'₂[1] ← distance.t1 + s1.dt
                    x'[2] ← x[s2.curve]
                    t'₁[2] ← distance.t2 − s2.dt
                    t'₂[2] ← distance.t2 + s2.dt
                    I ← CURVE-INTERSECTIONS(x', y', t'₁, t'₂,2, ε, η,λ,m,β,I)
                end if
            else
                intersection.c1 ←s1.curve
                intersection. c2 ←s2.curve
                intersection.t1 ← distance.ta1
                intersection.t2 ← distance.ta2
                APPEND(I, intersection)
                Intersection.c1 ← s1.curve
                Intersection.c2 ← s2.curve
                Intersection.t1 ← distance.tb1
                Intersection.t2← distance.tb2
                APPEND(I, intersection)
            end if
        end if
    end for
    return I
end function
```

The following function removes spurious self-intersections around the stationary points of the curve with vanishing or nearly vanishing derivatives:

```
function REMOVE-SPURIOUS-INTERSECTIONS (I, x, y, ε)
    I' ←empty-list
    for i∈I do
        t_{x1}←EVALUATE(derive(x[i:c1]; i.t1))
        t_{y1}←EVALUATE(derive(y[i:c1; i.t1))
        t_{x2}←EVALUATE(derive(x[i:c2]; i.t2))
        t_{y2}←EVALUATE(derive(y[i:c2]; i.t2))
        n1←√(t_{x1}²+t_{y1}²)
        n2←√(t_{x2}²+t_{y2}²)
        if |i.t1−i.t2|(n1−n2)≥2ε then
            APPEND(I', intersection)
        end if
    end for
    return I'
end function
```

Figure 11:
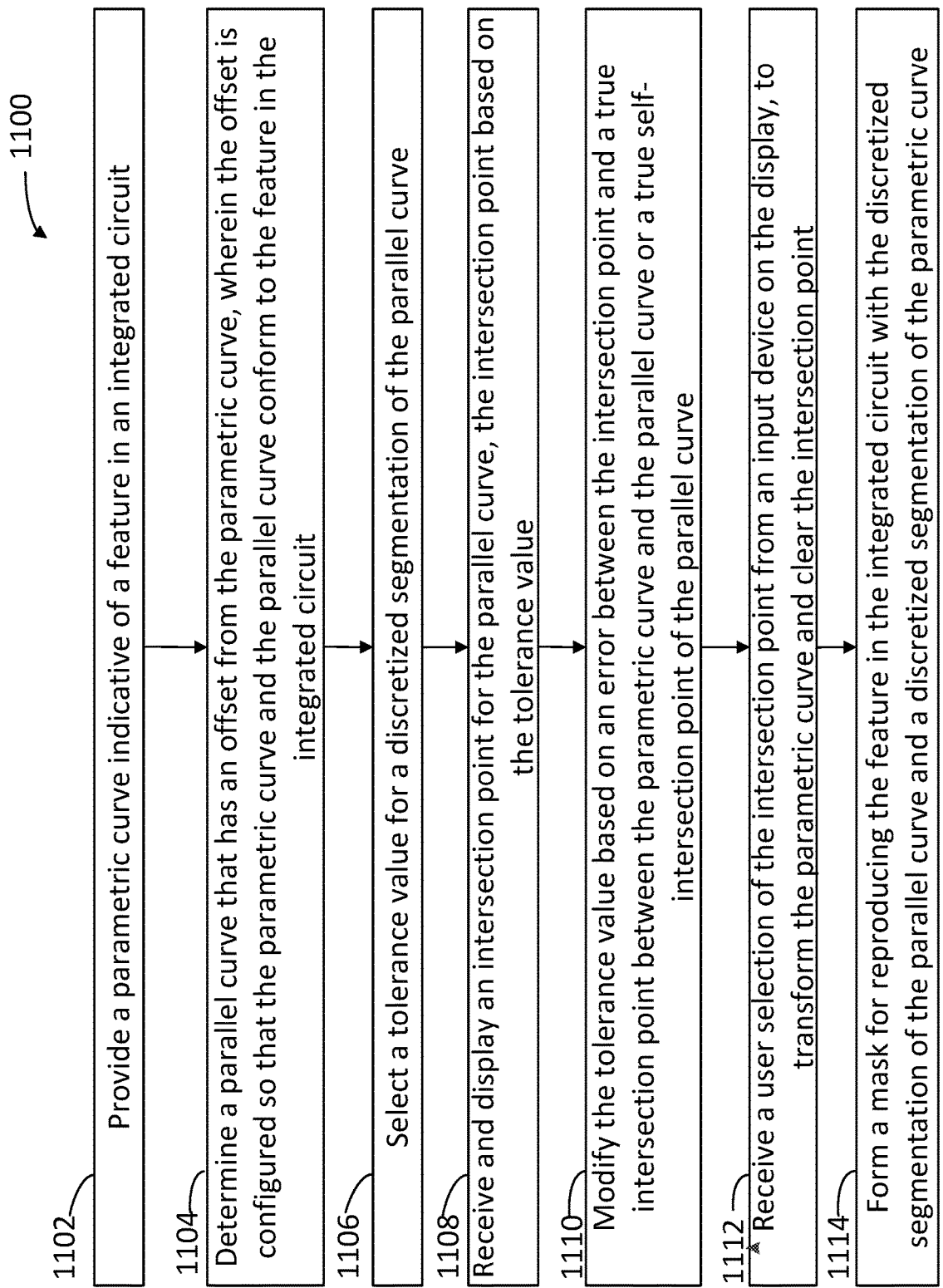
FIG. 11 is a flow chart illustrating steps in a method for selecting valid intersection points of planar parametric curves, according to some embodiments.

FIG. 11 is a flow chart illustrating steps in a method 1100 for selecting valid intersection points of planar parametric curves, according to some embodiments. At least some of the steps in method 1100 may be performed by a computer having a processor executing commands stored in a memory of the computer (e.g., processors 212 and 236, memories 220 and 232). Further, steps as disclosed in method 1100 may include retrieving, editing, and/or storing files in a database that is part of, or is communicably coupled to, the computer (e.g., database 252). Methods consistent with the present disclosure may include at least some, but not all, of the steps illustrated in method 1100, performed in a different sequence. Furthermore, methods consistent with the present disclosure may include at least two or more steps as in method 1100, performed overlapping in time, or almost simultaneously In some embodiments, at least one or more of the steps in method 1100 may be performed in a cloud computing environment, wherein a computer may include servers, such as a master server and a slave server. Accordingly, at least some of the steps illustrated in method 1100 may be performed in parallel in different processors, following separate computational threads. For example, each of the separate computational threads may be performed by at least one of the slave servers in each of multiple applications and processors dedicated to the specific computational thread.

Step 1102 includes providing a parametric curve indicative of a feature in an integrated circuit.

Step 1104 includes determining a parallel curve that has an offset from the parametric curve, wherein the offset is configured so that the parametric curve and the parallel curve conform to the feature in the integrated circuit.

Step 1106 includes selecting a tolerance value for a discretized segmentation of the parallel curve. In some embodiments, step 1106 further includes modifying the tolerance value based on an error between the intersection point and a true intersection point between the parametric curve and the parallel curve or a true self-intersection point of the parallel curve.

Step 1108 includes receiving and displaying (e.g., in display 216) an intersection point for the parallel curve, the intersection point based on the tolerance value. In some embodiments, step 1108 further includes selecting a second intersection point formed between the parallel curve and the parametric curve.

Step 1110 includes modifying the tolerance value based on an error between the intersection point and a true intersection point between the parametric curve and the parallel curve or a true self-intersection point of the parallel curve.

Step 1112 includes receiving a user selection of the intersection point from an input device on the display (e.g., a pointer, a mouse click, or a touch with input device 214), transforming the parametric curve to clear the intersection point. Accordingly, in some embodiments, step 1112 includes modifying a register in the memory of the computer by removing the coordinate values from at least a first and a second nodes in the segment to be removed between the first segment and the second segment. In some embodiments, step 1112 includes removing a segment from the discretized segmentation of the parallel curve to clear the intersection point. In some embodiments, step 1112 includes selecting the segment from a display of the intersection point and the parallel curve.

Figure 12:
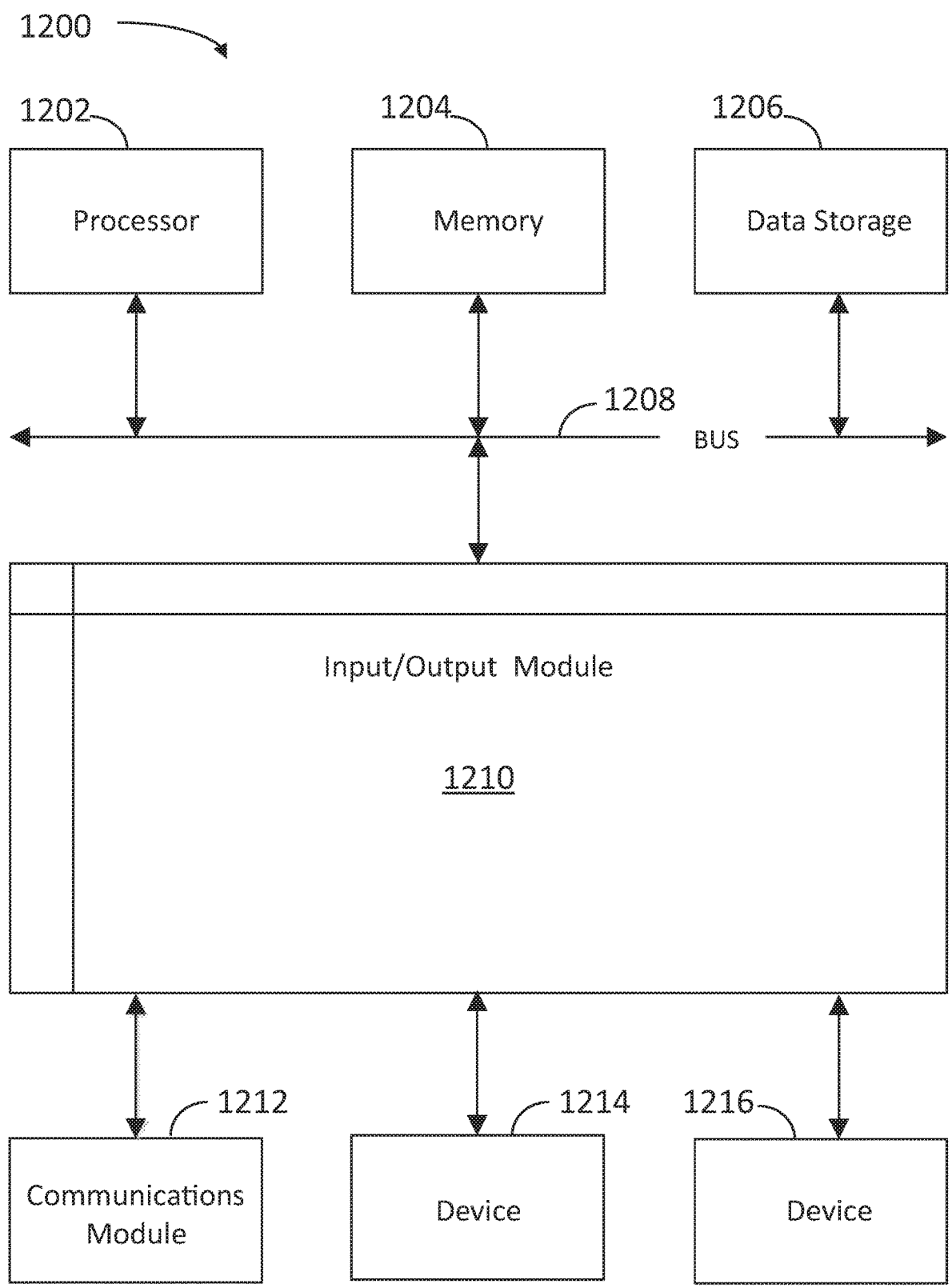
FIG. 12 is a block diagram illustrating an example computer system, according to some embodiments.

Step 1114 includes forming a mask for reproducing the feature in the integrated circuit with the discretized segmentation of the parallel curve and a discretized segmentation of the parametric curve FIG. 12 is a block diagram illustrating an example computer system 1200 with which the methods and steps illustrated in FIGS. 10-11 can be implemented, according to some embodiments. In certain aspects, computer system 1200 can be implemented using hardware or a combination of software and hardware, either in a dedicated server, integrated into another entity, or distributed across multiple entities.

Computer system 1200 includes a bus 1208 or other communication mechanism for communicating information, and a processor 1202 coupled with bus 1208 for processing information. By way of example, computer system 1200 can be implemented with one or more processors 1202. Processor 21202 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1202 may include modules and circuits configured as a 'placing' tool or engine, or a 'routing' tool or engine, to place devices and route channels in a circuit layout, respectively and as disclosed herein.

Computer system 1200 includes, in addition to hardware, code that creates an execution environment for the computer program in question, e.g., code that constitutes processor firmware, a protocol stack, a database management system, an operating system, or a combination of one or more of them stored in an included memory 1204, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. Processor 1202 and memory 1204 can be supplemented by, or incorporated in, special purpose logic circuitry.

The instructions may be stored in memory 1204 and implemented in one or more computer program products, e.g., one or more modules of computer program instructions encoded on a computer-readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PUP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis languages, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions.

Computer system 1200 is coupled via input/output module 1210 to various devices. The input/output module 1210 is any input/output module. Example input/output modules 1210 include data ports such as USB ports. The input/output module 1210 is configured to connect to a communications module 1212. Example communications modules 1212 include networking interface cards, such as Ethernet cards and modems. In certain aspects, the input/output module 1210 is configured to connect to a plurality of devices, such as an input device 1214 and/or an output device 1216. Example input devices 1214 include a keyboard and a pointing device, e.g., a mouse or a trackball, by which a user can provide input to the computer system 1200. Other kinds of input devices 1214 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1216 include display devices, such as an LED (light emitting diode), CRT (cathode ray tube), or LCD (liquid crystal display) screen, for displaying information to the user.

Methods as disclosed herein may be performed by computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein (e.g., as in methods). One or more processors in a multi-processing arrangement may also be employed to execute the sequences of instructions contained in memory 1204. In alternative aspects, hard-wired circuitry may be used in place of, or in combination with, software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 1200 includes servers and personal computer devices. A personal computing device and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1202 for execution. Such a medium may take many forms, including, but not limited to, non-volatile media, volatile media, and transmission media. Non-volatile media include, for example, optical disks, magnetic disks, or flash memory, such as data storage device 1206. Volatile media include dynamic memory, such as memory 1204. Transmission media include coaxial cables, copper wire, and fiber optics, including the wires forming bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or "the like" is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
    finding, for a discretized curve comprising multiple segments, a first segment and a second segment that are closer than a threshold, wherein:
        the discretized curve is obtained by transforming, within a tolerance value, a parametric curve indicative of a feature in an integrated circuit based on a parameter value into the multiple segments,
        the first segment is associated with a first interval of the parameter value,
        the second segment is associated with a second interval of the parameter value, and
        the first interval and the second interval do not overlap;
    determining an intersection point of the first segment and the second segment, the intersection point associated with a first parameter value for the first segment and a second parameter value for the second segment;
    determining an error value as a distance between a first point in the parametric curve corresponding to the first parameter value and a second point in the parametric curve corresponding to the second parameter value;
    selecting the intersection point when the error value is smaller than a precision tolerance;

transforming the discretized curve by removing at least a segment between the first segment and the second segment; and providing the discretized curve to manufacture a mask for reproducing the feature in the integrated circuit.

2. The computer-implemented method of claim 1, further comprising reducing the tolerance value for the discretized curve when the error value is larger than the precision tolerance.

3. The computer-implemented method of claim 1, wherein the first segment and the second segment are collinearly overlapping, further comprising determining an intersection point as a first point in an overlapping segment formed between the first segment and the second segment when the error value is smaller than the precision tolerance.

4. The computer-implemented method of claim 1, further comprising removing the intersection point when at least one of the first parameter value or the second parameter value corresponds to a stationary point of the parametric curve.

5. The computer-implemented method of claim 1, wherein removing at least a portion of the parametric curve between the first segment and the second segment comprises:

removing all segments between the first segment and the second segment, removing a portion of the first segment after the intersection point, and removing a portion of the second segment that is before the intersection point, according to the parameter value.

6. The computer-implemented method of claim 1, further comprising selecting a point along a normal to a generator curve, the point separated by a selected distance from the generator curve to form the parametric curve, wherein the feature in the integrated circuit is bound between the generator curve and the parametric curve.

7. The computer-implemented method of claim 1, further comprising selecting a point along a normal to a generator curve, the point separated by a selected distance from the generator curve to form the parametric curve, wherein the first segment belongs to a discretized segmentation of the generator curve and the second segment belongs to a discretized segmentation of the parametric curve.

8. The computer-implemented method of claim 1, further comprising finding a third segment in the discretized curve that is closer to the first segment than the threshold, and determining a second intersection point between the first segment and the third segment.

9. The computer-implemented method of claim 1, wherein the second segment belongs to a discretized segmentation of a second parametric curve, and removing, from the discretized curve, at least a segment that is between the first segment and the second segment comprises removing a segment between the intersection point of the first segment and the second segment and a second intersection point between the parametric curve and the second parametric curve.

10. The computer-implemented method of claim 1, wherein removing at least a portion of the parametric curve between the first segment and the second segment comprises receiving a user input selecting the segment.

11. A system, comprising:

a memory storing instructions; and one or more processors configured to execute the instructions to cause the system to:

find, for a discretized curve comprising multiple segments, a first segment and a second segment that are closer than a threshold, wherein:

the discretized curve is obtained within a tolerance value from a parametric curve indicative of a feature in an integrated circuit based on a parameter value, the first segment is associated with a first interval of the parameter value, the second segment is associated with a second interval of the parameter value, and the first interval and the second interval do not overlap;

determine an intersection point of the first segment and the second segment, the intersection point associated with a first parameter value for the first segment and a second parameter value for the second segment;

determine an error value as a distance between a first point in the parametric curve corresponding to the first parameter value and a second point in the parametric curve corresponding to the second parameter value;

select the intersection point when the error value is smaller than a precision tolerance;

transform the discretized curve by removing at least a segment between the first segment and the second segment; and provide the discretized curve to manufacture a mask for reproducing the feature in the integrated circuit.

12. The system of claim 11, wherein the one or more processors further execute instructions to reduce the tolerance value for the discretized curve when the error value is larger than the precision tolerance.

13. The system of claim 11, wherein the first segment and the second segment are collinearly overlapping, and wherein the one or more processors further execute instructions to determine an intersection point as a first point in an overlapping segment formed between the first segment and the second segment when the error value is smaller than the precision tolerance.

14. The system of claim 11, wherein the one or more processors further execute instructions to remove the intersection point when at least one of the first parameter value or the second parameter value corresponds to a stationary point of the parametric curve.

15. The system of claim 11, wherein to remove at least a portion of the parametric curve between the first segment and the second segment the one or more processors further execute instructions to remove all segments between the first segment and the second segment, and to remove a portion of the first segment after the intersection point, and to remove a portion of the second segment that is before the intersection point, according to the parameter value.

16. The system of claim 11, further comprising selecting a point along a normal to a generator curve, the point separated by a selected distance from the generator curve to form the parametric curve, wherein the feature in the integrated circuit is bound between the generator curve and the parametric curve.

17. A computer-implemented method, comprising:

providing a parametric curve indicative of a feature in an integrated circuit;

selecting a tolerance value for a discretized segmentation of a parallel curve, the parallel curve obtained with an offset from the parametric curve such that the parametric curve and the parallel curve conform to the feature in the integrated circuit;

receiving and displaying in a display an intersection point for the parallel curve, the intersection point based on the tolerance value;

receiving a user selection of the intersection point from an input device on the display, transforming the parametric curve and clearing the intersection point; and forming a mask for reproducing the feature in the integrated circuit with the discretized segmentation of the parallel curve and a discretized segmentation of the parametric curve.

18. The computer-implemented method of claim 17, further comprising modifying the tolerance value based on an error between the intersection point and a true intersection point between the parametric curve and the parallel curve or a true self-intersection point of the parallel curve.

19. The computer-implemented method of claim 17, further comprising selecting a second intersection point formed between the parallel curve and the parametric curve.

20. The computer-implemented method of claim 17, wherein removing the portion from the parametric curve comprises selecting the portion from a display of the intersection point and the parallel curve.

\* \* \* \* \*